(12) United States Patent
He

(10) Patent No.: US 12,434,235 B2
(45) Date of Patent: Oct. 7, 2025

(54) CARTRIDGE AND BIOLOGICAL DETECTION SYSTEM

(71) Applicant: SKYLA Corporation, Hsinchu (TW)

(72) Inventor: Sz-Shian He, Hsinchu (TW)

(73) Assignee: SKYLA Corporation, Hsinchu (TW)

( * ) Notice: Subject to any disclaimer, the term of this patent is extended or adjusted under 35 U.S.C. 154(b) by 442 days.

(21) Appl. No.: 17/978,232

(22) Filed: Nov. 1, 2022

(65) Prior Publication Data

US 2023/0050554 A1     Feb. 16, 2023

Related U.S. Application Data

(63) Continuation-in-part of application No. 17/308,997, filed on May 5, 2021, now Pat. No. 12,117,461.

(30) Foreign Application Priority Data

Jan. 7, 2021 (TW) .................................. 110100572
Sep. 1, 2022 (TW) .................................. 111133137

(51) Int. Cl.
*G01N 35/10* (2006.01)
*B01L 3/00* (2006.01)

(52) U.S. Cl.
CPC .............. *B01L 3/502* (2013.01); *G01N 35/10* (2013.01); *B01L 2200/0684* (2013.01);
(Continued)

(58) Field of Classification Search
CPC ...... G01N 35/10; B01L 3/502; B01L 2200/16; B01L 2200/0684; B01L 2300/0883; B01L 2400/0406; B01L 2400/0409
See application file for complete search history.

(56) References Cited

U.S. PATENT DOCUMENTS 4,814,282 A      3/1989  Holen et al.
12,117,461 B2 * 10/2024  He ................... B01L 3/502753
(Continued)

FOREIGN PATENT DOCUMENTS

CN       104657400        5/2015
CN       107305210        10/2017
(Continued)

OTHER PUBLICATIONS

"Office Action of China Counterpart Application", issued on Mar. 18, 2024, p. 1-p. 13.
(Continued)

*Primary Examiner* — Jamel E Williams
(74) *Attorney, Agent, or Firm* — JCIPRNET

(57) ABSTRACT

A cartridge is for a detection of a sample or a first component, wherein the sample includes the first component and a second component. The cartridge includes a first injection chamber, a second injection chamber, a separation chamber, a collection chamber and a first detection chamber. The first injection chamber and the second injection chamber are adapted for injecting the sample or the first component. The separation chamber is connected to the first injection chamber, and the sample injected from the first injection chamber is adapted to be separated into the first component and the second component in the separation chamber. The collection chamber is connected to the separation chamber and the second injection chamber. The first detection chamber is connected to the collection chamber. A biological detection system is further provided.

20 Claims, 33 Drawing Sheets

Related U.S. Application Data

(60) Provisional application No. 63/278,111, filed on Nov. 11, 2021, provisional application No. 63/054,806, filed on Jul. 22, 2020.

(52) U.S. Cl.
CPC ... *B01L 2200/16* (2013.01); *B01L 2300/0883* (2013.01); *B01L 2400/0406* (2013.01); *B01L 2400/0409* (2013.01)

(56) References Cited

U.S. PATENT DOCUMENTS

| | | |
|---|---|---|
| 2003/0031601 A1 | 2/2003 | Gebrian et al. |
| 2005/0069913 A1 | 3/2005 | Mian et al. |
| 2008/0081755 A1 | 4/2008 | Kinpara et al. |
| 2018/0067379 A1 | 3/2018 | Rho et al. |
| 2020/0300752 A1* | 9/2020 | Horii .................. G01N 21/01 |
| 2021/0229098 A1 | 7/2021 | Boehm et al. |
| 2021/0291160 A1* | 9/2021 | Wescott ................ B01L 3/502 |
| 2021/0382077 A1 | 12/2021 | Holmes et al. |

FOREIGN PATENT DOCUMENTS

| | | | |
|---|---|---|---|
| CN | 113237799 | 8/2021 | |
| CN | 113237800 | 8/2021 | |
| CN | 113634295 | 11/2021 | |
| EP | 1129783 | 9/2001 | |
| EP | 3020682 | 5/2016 | |
| EP | 3315198 | 5/2018 | |
| EP | 3646949 | 5/2020 | |
| EP | 3646949 B1 * | 12/2021 | .......... B01L 3/50273 |
| JP | 2012021854 | 2/2012 | |
| JP | 2012021854 A * | 2/2012 | |
| TW | 201107038 | 3/2011 | |
| TW | 201344193 | 11/2013 | |
| TW | 1693404 | 5/2020 | |
| WO | 2004011147 | 2/2004 | |
| WO | 2011081530 | 7/2011 | |
| WO | WO-2011081530 A1 * | 7/2011 | ........ B01L 3/502738 |
| WO | 2014050946 | 4/2014 | |
| WO | WO-2014050946 A1 * | 4/2014 | ........ B01L 3/502753 |
| WO | 2015080192 | 6/2015 | |
| WO | 2019127958 | 7/2019 | |
| WO | 2021076134 | 4/2021 | |

OTHER PUBLICATIONS

"Office Action of Taiwan Counterpart Application", issued on Jul. 18, 2023, p. 1-p. 10.
"Notice of allowance of China Related Application, Application No. 202110179330.1", issued on Jun. 21, 2024, p. 1-p. 4.
"Search Report of Europe Counterpart Application", issued on Nov. 30, 2022, p. 1-p. 16.
"Search Report of Europe Counterpart Application", issued on Mar. 13, 2023, p. 1-p. 8.
"Search Report of Europe Related Application, Application No. 22190489.9", issued on Mar. 17, 2023, p. 1-p. 19.

* cited by examiner

CARTRIDGE AND BIOLOGICAL DETECTION SYSTEM

CROSS-REFERENCE TO RELATED APPLICATION

This application is a continuation-in-part application of and claims the priority benefit of U.S. application Ser. No. 17/308,997, filed on May 5, 2021, now pending, which claims the priority benefit of U.S. provisional application Ser. No. 63/054,806, filed on Jul. 22, 2020 and Taiwan application serial no. 110100572, filed on Jan. 7, 2021. This application also claims the priority benefit of U.S. provisional application Ser. No. 63/278,111, filed on Nov. 11, 2021 and Taiwan application serial no. 111133137, filed on Sep. 1, 2022. The entirety of each of the above-mentioned patent applications is hereby incorporated by reference herein and made a part of this specification.

BACKGROUND

Technical Field

The disclosure relates to a cartridge and a detection system, and in particular relates to a cartridge and a biological detection system.

Description of Related Art

At present, if the cartridge is to detect one of the components in a specimen with multiple components (e.g., a cartridge in which the specimen is whole blood is to be used to detect the blood plasma in the whole blood), in this cartridge, the components to be detected in the specimen is separated first (e.g., blood cells and blood plasma are separated from the whole blood first), and then the components to be detected (e.g., blood plasma) is detected. Therefore, it is necessary to inject a certain amount of specimen (e.g., whole blood) in order to separate a sufficient amount of the component to be detected (e.g., blood plasma) afterward.

However, if the component to be detected (e.g., blood plasma) is to be directly injected into the cartridge, the amount of the component to be detected (e.g., blood plasma) to be injected still needs to be the same as the amount of the specimen (e.g., whole blood), therefore more specimen (e.g., whole blood) needs to be drawn, causing discomfort to the organism. In addition, since the amount of the component to be detected (e.g., blood plasma) to be injected is greater than the amount actually used, there are more waste.

SUMMARY

The disclosure provides a cartridge, which may detect a first component of the sample, and the sample may be injected into the first injection chamber in the form of the sample or into the second injection chamber in the form of the first component, which may effectively reduce waste.

A cartridge of the disclosure is for a detection of a sample or a first component, the sample includes the first component and a second component, and the cartridge includes a first injection chamber, a second injection chamber, a separation chamber, a collection chamber and a first detection chamber. The first injection chamber is adapted for injecting the sample. The second injection chamber is adapted for injecting the first component. The separation chamber is connected to the first injection chamber, the sample injected from the first injection chamber is adapted to be separated into the first component and the second component in the separation chamber. The collection chamber is connected to the separation chamber and the second injection chamber. The first detection chamber is connected to the collection chamber.

In an embodiment of the disclosure, a density of the first component is lower than a density of the second component, the separation chamber includes a lower separation portion and an upper separation portion, the upper separation portion is connected to the collection chamber, the separated first component is adapted to be located in the upper separation portion, the separated second component is adapted to be located corresponding to the lower separation portion.

In an embodiment of the disclosure, the separation chamber further includes a connecting portion, connected between the lower separation portion and the upper separation portion, a chamber body width of the connecting portion in a width direction is relatively smaller than a chamber body width of the upper separation portion or the lower separation portion in the width direction.

In an embodiment of the disclosure, the cartridge further includes a fluid chamber, connected to the collection chamber, the collection chamber is located on a same side of the separation chamber, the fluid chamber, and the second injection chamber.

In an embodiment of the disclosure, the cartridge further includes an accommodating portion and a release structure, the accommodating portion is connected to the fluid chamber, the accommodating portion is recessed inward from an outer side of the cartridge, and the release structure is disposed in the accommodating portion.

In an embodiment of the disclosure, the cartridge further includes a first quantitative chamber and a second quantitative chamber. The first quantitative chamber is connected between the collection chamber and the first detection chamber. The second quantitative chamber is connected to the first quantitative chamber, in which the second quantitative chamber is located on a same side of the first quantitative chamber and the collection chamber.

In an embodiment of the disclosure, the cartridge further includes a third quantitative chamber and a first connecting duct. The third quantitative chamber is connected between the first quantitative chamber and the first detection chamber. The first connecting duct is connected between the third quantitative chamber and the first detection chamber, and includes a first section and a second section that are connected in a bending manner. The first section is connected to the third quantitative chamber, the second section is connected to the first detection chamber, and the first section and the first quantitative chamber are located on a same side of the third quantitative chamber.

In an embodiment of the disclosure, the cartridge further includes a fourth quantitative chamber, a second connecting duct, and a second detection chamber. The fourth quantitative chamber is connected to the second quantitative chamber. The second connecting duct is connected to the fourth quantitative chamber, and includes a third section and a fourth section connected in a bending manner. The third section is connected to the fourth quantitative chamber. The second detection chamber is connected to the fourth section, and the third section and the second quantitative chamber are located on a same side of the fourth quantitative chamber.

In an embodiment of the disclosure, the cartridge includes a rotation center, and the separation chamber is further away from the rotation center than the first injection chamber.

In an embodiment of the disclosure, a density of the first component is lower than a density of the second component, the separation chamber includes a lower separation portion and an upper separation portion, the separated first component is adapted to be located in the upper separation portion, the separated second component is adapted to be located corresponding to the lower separation portion, and the cartridge further includes a first connecting duct, which is connected to the collection chamber and the upper separation section of the separation chamber.

In an embodiment of the disclosure, the cartridge further includes a fluid chamber and a second connecting duct. The fluid chamber is adapted to contain fluid. The second connecting duct is connected between the fluid chamber and the collection chamber.

In an embodiment of the disclosure, the cartridge further includes a fluid quantitative chamber, which is connected between the fluid chamber and the second connecting duct, and the fluid quantitative chamber is further away from the rotation center than the fluid chamber.

In an embodiment of the disclosure, the cartridge further includes a fluid detection chamber, which is connected to the fluid quantitative chamber, and the fluid detection chamber is further away from the rotation center than the fluid quantitative chamber.

In an embodiment of the disclosure, the cartridge further includes a distribution chamber and a third connecting duct. The first detection chamber is further away from the rotation center than the distribution chamber. The third connecting duct is connected to the collection chamber and the distribution chamber.

In an embodiment of the disclosure, the cartridge further includes a fourth connecting duct, which is connected to the second injection chamber and the collection chamber.

A biological detection system of the disclosure includes a first turntable, a second turntable, and a cartridge. The first turntable has a first rotary shaft. The second turntable has a second rotary shaft, and the second turntable disposed on the first turntable is rotatable about the second rotary shaft independent from the first rotary shaft. The cartridge is detachably disposed on the second turntable. The cartridge is for a detection of a sample or a first component, the sample includes the first component and a second component, and the cartridge includes a first injection chamber, a second injection chamber, a separation chamber, a collection chamber and a first detection chamber. One of the sample and the first component is selectively injected into the first injection chamber or the second injection chamber. The separation chamber is connected to the first injection chamber, the sample injected from the first injection chamber is adapted to be separated into the first component and the second component in the separation chamber. The collection chamber is connected to the separation chamber and the second injection chamber, in which the first component separated by the separation chamber and the first component injected from the second injection chamber are adapted to flow to the collection chamber. The first detection chamber is connected to the collection chamber, in which the first component in the collection chamber is adapted to flow to the first detection chamber for detection. The first turntable is driven to rotate about the first rotary shaft, and the second turntable is independently driven to rotate the cartridge about the second rotary shaft.

Based on the above, in the biological detection system and the cartridge of the disclosure, the first injection chamber of the cartridge is adapted for injecting the sample, the separation chamber is connected to the first injection chamber, and the sample injected from the first injection chamber is adapted to be separated into the first component and the second component in the separation chamber. Furthermore, the second injection chamber is adapted for injecting the first component. The collection chamber is connected to the separation chamber and the second injection chamber, so that the first component separated by the separation chamber and the first component injected by the second injection chamber are adapted to flow to the same collection chamber. The first detection chamber is connected to the collection chamber. Therefore, the first component in the collection chamber may flow to the first detection chamber for detection. That is to say, the cartridge has a second injection chamber specially used for injecting the first component, and the first component injected from the second injection chamber may flow to the collection chamber without being affected by the chamber capacity or path between the first injection chamber and the separation chamber. Therefore, the injection amount of the first component may be more flexible.

DETAILED DESCRIPTION OF DISCLOSED EMBODIMENTS

Figure 1:
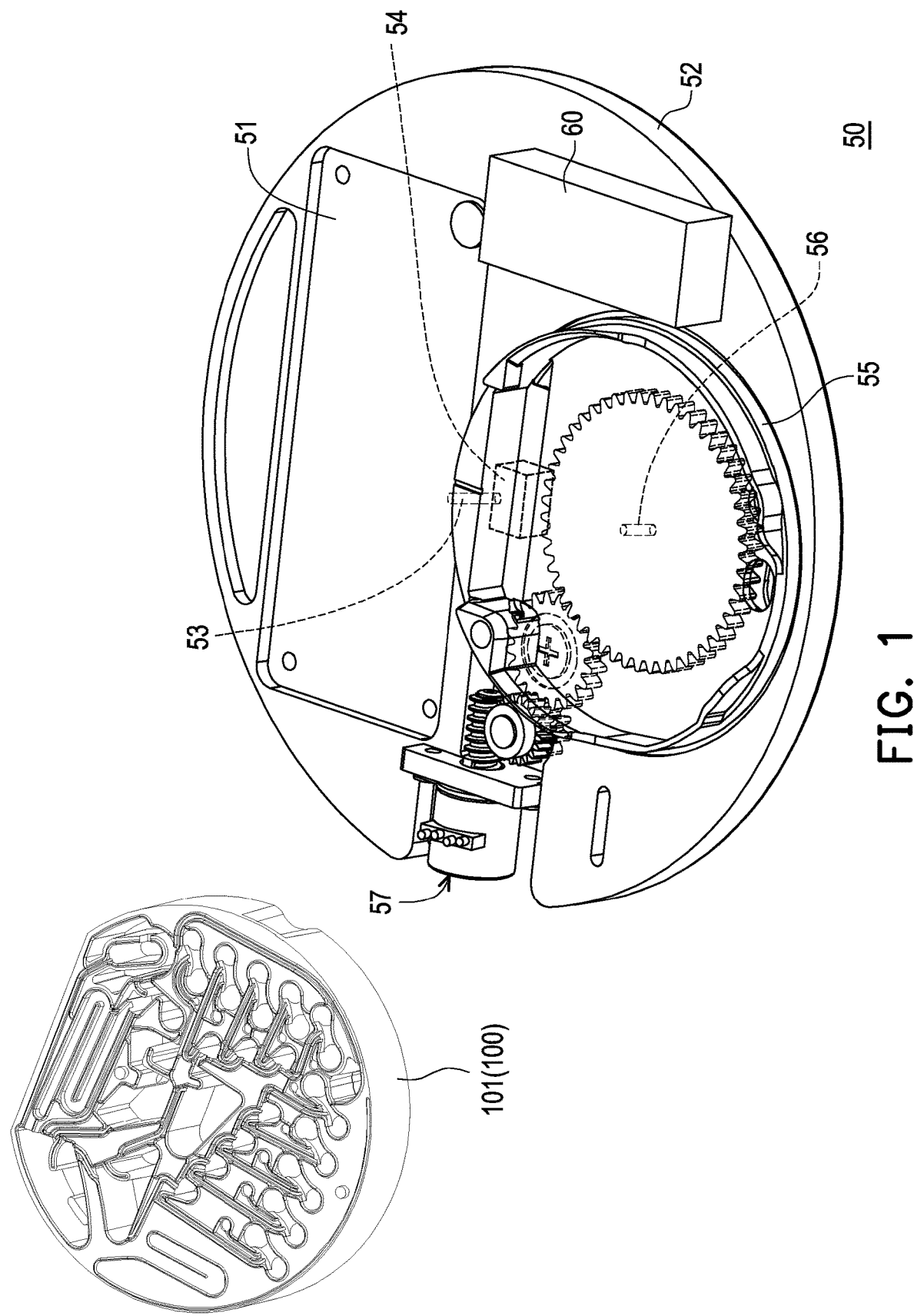
FIG. 1 is a schematic diagram of a biological detection system according to an embodiment of the disclosure.

FIG. 1 is a schematic diagram of a biological detection system according to an embodiment of the disclosure. Referring to FIG. 1, a biological detection system 50 of this embodiment includes a control module 51, a first turntable 52, a first driving module 54, a second turntable 55, a second driving module 57, and a cartridge 100.

The first turntable 52 has a first rotary shaft 53. The first driving module 54 is electrically connected to the control module 51 and is linked with the first rotary shaft 53 to receive an instruction from the control module 51 to drive the first turntable 52 to rotate about the first rotary shaft 53. In FIG. 1, the control module 51 and the first driving module 54 are only schematically shown, and the forms of the control module 51 and the first driving module 54 are not limited thereto. The first driving module 54 may be a motor, a memory metal deformed by temperature changes, or other forms of actuators.

In addition, the second turntable 55 has a second rotary shaft 56 different from the first rotary shaft 53, and the first rotary shaft 53 and the second rotary shaft 56 are not coaxial. The second turntable 55 disposed on the first turntable 52 is rotatable about the second rotary shaft 56. The second turntable 55 is independently rotatable about the second rotary shaft 56 and is disposed on the first turntable 52. The second driving module 57 is electrically connected to the control module 51 and is linked to the second rotary shaft 56. The second turntable 55 is driven to rotate independently about the second rotary shaft 56 by receiving the instruction from the control module 51. Therefore, the rotational direction or rotational speed of the second rotary shaft 56 and the first rotary shaft 53 may be different.

It should be noted that, in this embodiment, the number of the second turntable 55 is one as an example, but the number of the second turntable 55 and the second driving module 57 is not limited thereto. In addition, in other embodiments, the second driving module 57 may also push the edge or other portions of the second turntable 55 so that the second turntable 55 rotates independently. It is not necessary to independently rotate the second turntable 55 by driving the second rotary shaft 56. In addition, the second driving module 57 may be a motor, a memory metal deformed by temperature changes, or other forms of actuators.

In the biological detection system 50 of the embodiment, the first turntable 52 is driven by the first driving module 54 to rotate about the first rotary shaft 53, so as to provide centrifugal force to the cartridge 100 disposed on the first turntable 52. At the same time, the second turntable 55 is independently driven by the second driving module 57 to independently rotate the cartridge 100 about the second rotary shaft 56 to adjust the cartridge 100 Since the second turntable 55 may be independently driven by the dedicated second driving module 57, it has a dedicated rotational speed, rotational direction, and rotational angle, to bear or offset the centrifugal force generated by the rotation of the first turntable 52 according to different needs; alternatively, when multiple second turntables 55 are disposed on the carrier turntable 52, each second turntable 55 may independently adjust the individual cartridges 100, so that each cartridge 100 may have different rotational speeds, rotational directions, or rotational angles.

In addition, in this embodiment, the biological detection system 50 may optionally include a charging module 60 that is electrically connected to the control module 51. The charging module 60 may be a wireless charging module 60 or a wired charging module 60 to provide power to the control module 51, the first driving module 54, and the second driving module 57.

In this embodiment, the cartridge 100 is detachably disposed on the second turntable 55. The tester may install the required cartridge 100 on the second turntable 55 by himself. After the test is completed, the cartridge 100 may be removed from the second turntable 55. The tester may also test cartridges for other tests as required.

In addition, in this embodiment, the cartridge 100 is adapted for detecting the sample 10 (FIG. 5A) and the first component 12 (FIG. 5A), in which the first component 12 is a component included in the sample 10. The cartridge 100 may be injected with the sample 10 or the first component 12, and the first component 12 separated from the sample 10 or the first component 12 directly injected is detected. The amount of the injected first component may not be affected by the amount of sample that needs to be injected. Next, the cartridge 100 is described.

Figure 2A:
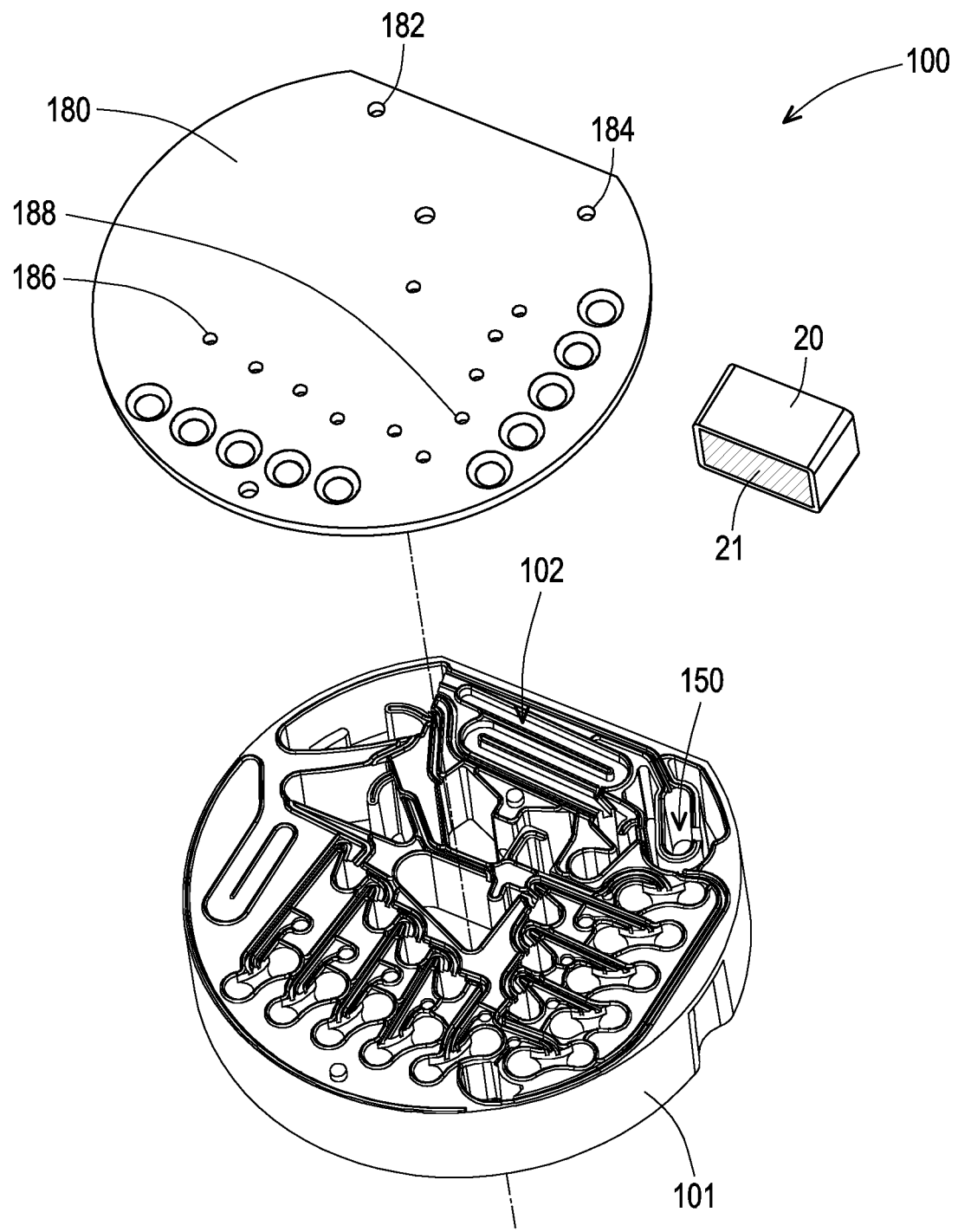
FIG. 2A and FIG. 2B are exploded schematic diagrams of a cartridge according to an embodiment of the disclosure.
Figure 2B:
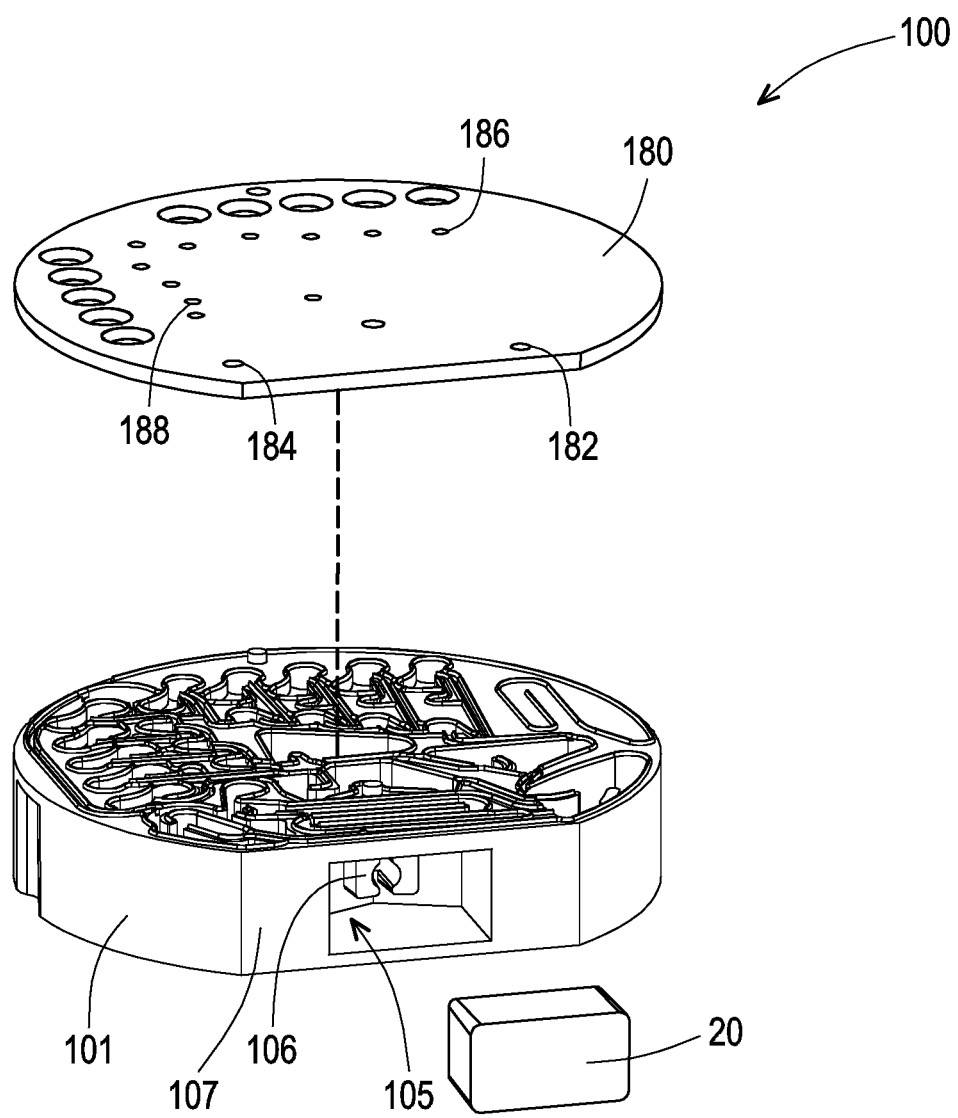
Figure 2C:
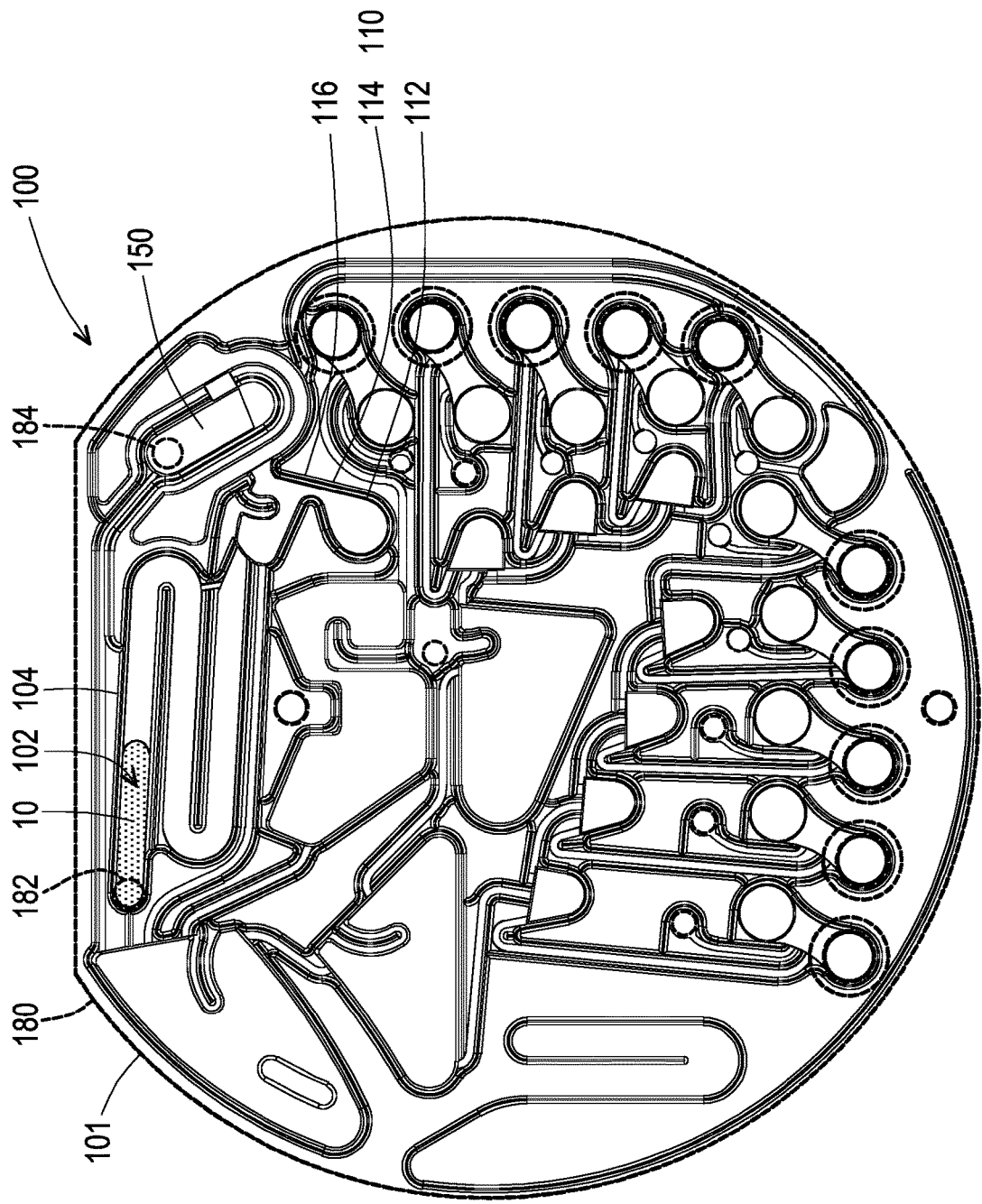
FIG. 2C is a top schematic diagram of the cartridge of FIG. 2A.
Figure 15:
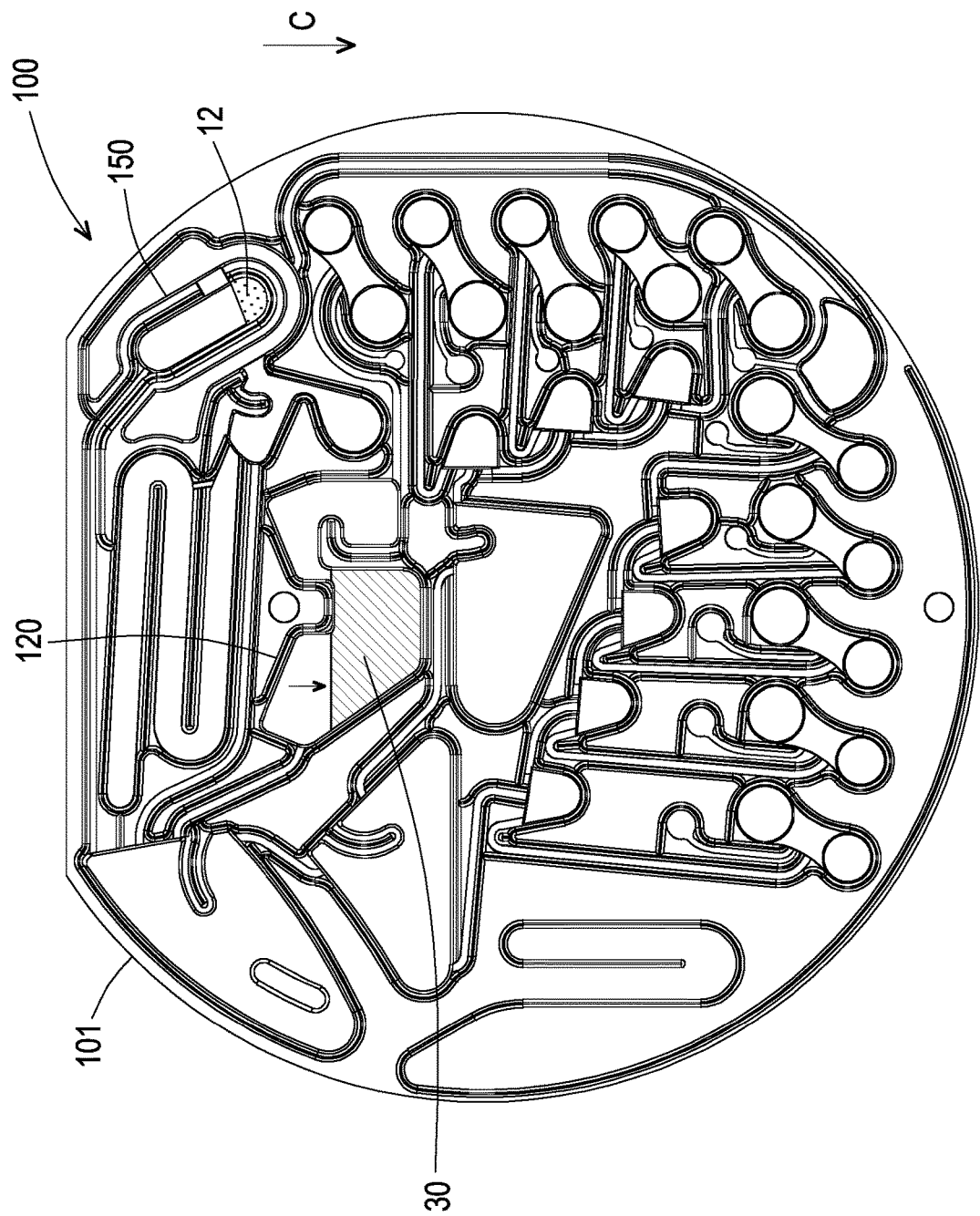
FIG. 15 to FIG. 16 are schematic diagrams of the flow of the first component in the cartridge of FIG. 2A to the collection chamber.

FIG. 2A and FIG. 2B are exploded schematic diagrams of a cartridge according to an embodiment of the disclosure. FIG. 2C is a top schematic diagram of the cartridge of FIG. 2A. In FIG. 2C, an upper cover 180 covers the main body 101, and the upper cover 180 is represented by a dotted line. Referring to FIG. 2A to FIG. 2C, the cartridge 100 of this embodiment is for a detection of the sample 10 (FIG. 4) or the first component 12 (FIG. 15). The cartridge 100 includes a main body 101 and an upper cover 180. The main body 101 includes multiple chambers and flow channels. The upper cover 180 may optionally be a transparent plate, so as to clearly see the flow of the sample 10 or the first component 12 in the main body 101. On the other hand, the transparent or light-transmitting upper cover 180 may also facilitate the penetration of light to perform optical detection on the specimen in the cartridge 100, in which the optical detection is, for example, measuring optical properties such as absorbed light, fluorescence, luminescence, etc.

In this embodiment, a first inlet 182 of the upper cover 180 is connected to the first injection chamber 102 of the main body 101, and a second inlet 184 of the upper cover 180 is connected to the second injection chamber 150 of the main body 101. One of the sample 10 and the first component 12 is selectively injected into the first injection chamber 102 or the second injection chamber 150. The sample 10 may flow into the first injection chamber 102 of the main body 101 from the first inlet 182 of the upper cover 180. The first component 12 may flow into the second injection chamber 150 of the main body 101 from the second inlet 184 of the upper cover 180. In addition, the fluid or liquid used to mix with the sample 10 is stored within the fluid box 20 (FIG. 2A).

As can be seen from FIG. 2B, the main body 101 includes an accommodating portion 105, and the accommodating portion 105 is connected to at least one chamber or flow channel. In one embodiment, the accommodating portion 105 may be an accommodating space (such as an opening or a cavity) formed by inwardly recessing an outer side of the main body 101, and the fluid box 20 may be placed in the main body 101 through the accommodating portion 105. As shown in FIG. 2A, the fluid box 20 includes a membrane 21, and the membrane 21 is disposed, for example, toward the inner side of the main body 101. The main body 101 further includes a corresponding release structure 106 located deep in the accommodating portion 105.

When the fluid box 20 is placed in the accommodating portion 105, the release structure that may be a puncture structure is positioned next to the membrane 21 and not yet in contact with the membrane 21. When the liquid in the fluid box 20 is required to flow into the main body 101, the fluid box 20 may be pushed inward to the depth of the accommodating portion 105 by a push rod (not shown) of the biological detection system 50, so that the membrane 21 is pierced by the release structure 106, thereby the fluid 30 stored in the fluid box 20 flows out and flows into the corresponding chamber or flow channel of the main body 101.

In addition, the cartridge 100 further includes a positioning portion 107 for engaging the cartridge 100 on the second turntable 55. In this embodiment, when the cartridge 100 is installed on the second turntable 55 or detached from the second turntable 55, the positioning portion 107 may be disposed at the first rotary shaft 53 (as shown in FIG. 1) on the main body 101 facing the first turntable 52. For example, the positioning portion 107 includes a structure (e.g., the plane shown in FIG. 2B) extending toward the geometric center of the main body 101 or recessing inwards. The accommodating portion 105 and the fluid box 20 are, for example, located on the same side of the positioning portion 107.

The flow process after the sample 10 is injected into the cartridge 100 is described below. FIG. 3 to FIG. 14 are schematic diagrams of the flow process of the sample in the cartridge of FIG. 2A. It should be noted that, in the following figures, the rotational direction of the cartridge 100 is indicated by a thick arrow, and the flow direction of the fluid in the cartridge 100 is indicated by a thin arrow.

Figure 3:
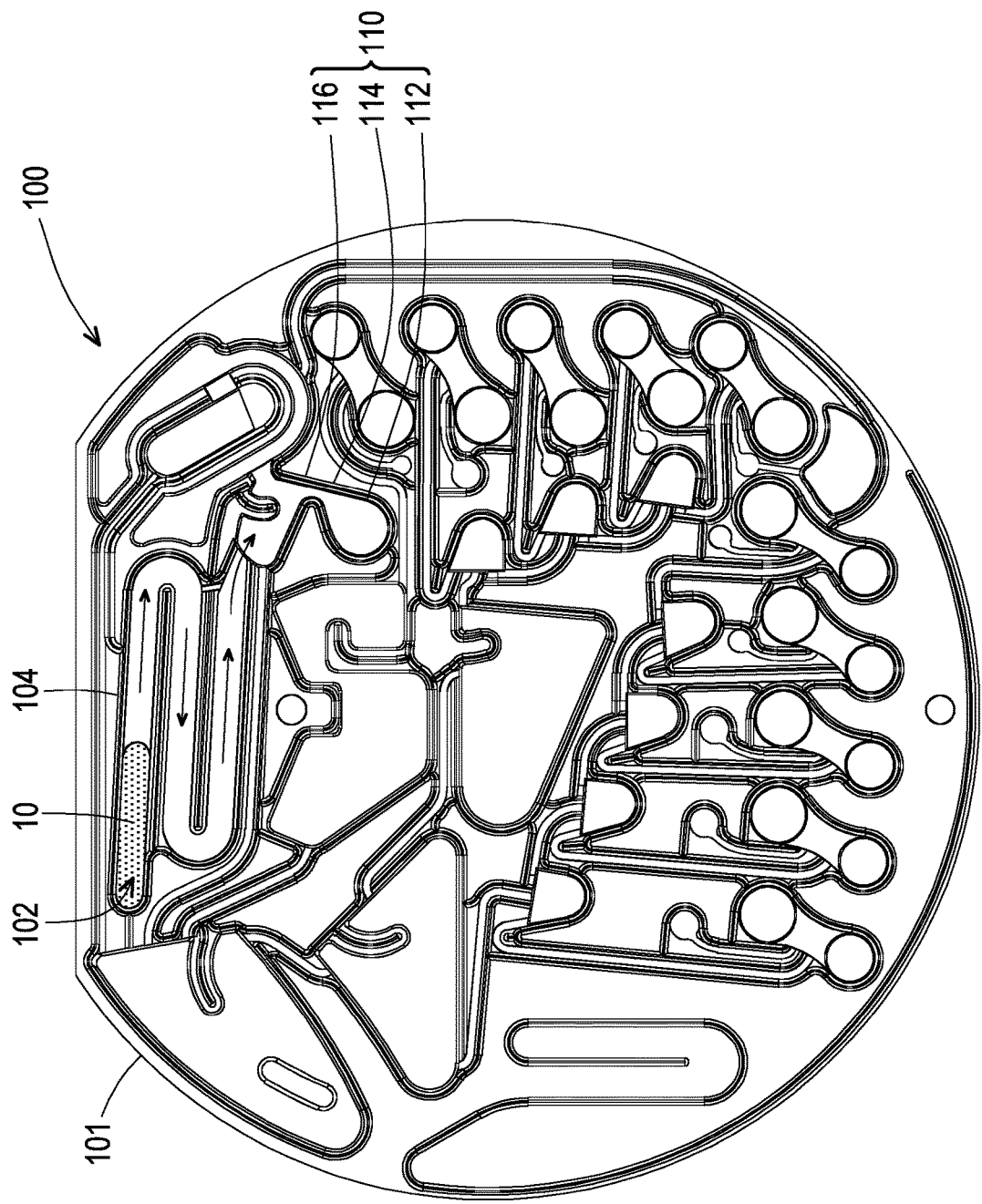
FIG. 3 to FIG. 14 are schematic diagrams of the flow process of the sample in the cartridge of FIG. 2A.

Referring to FIG. 3 first, the cartridge 100 of the embodiment includes a first injection chamber 102, an input flow channel 104, and a separation chamber 110. The first injection chamber 102 is adapted for injecting the sample 10. The sample 10 is, for example, whole blood, but the type of the sample 10 is not limited thereto. The separation chamber 110 is connected to the first injection chamber 102. Specifically, the input flow channel 104 is connected between the first injection chamber 102 and the separation chamber 110, and the input flow channel 104 may be used for quantification, so that a specific volume of the sample 10 enters the separation chamber 110. In one embodiment, the input flow channel 104 may also simply serve as a flow channel for the sample 10 to pass through.

Figure 4:
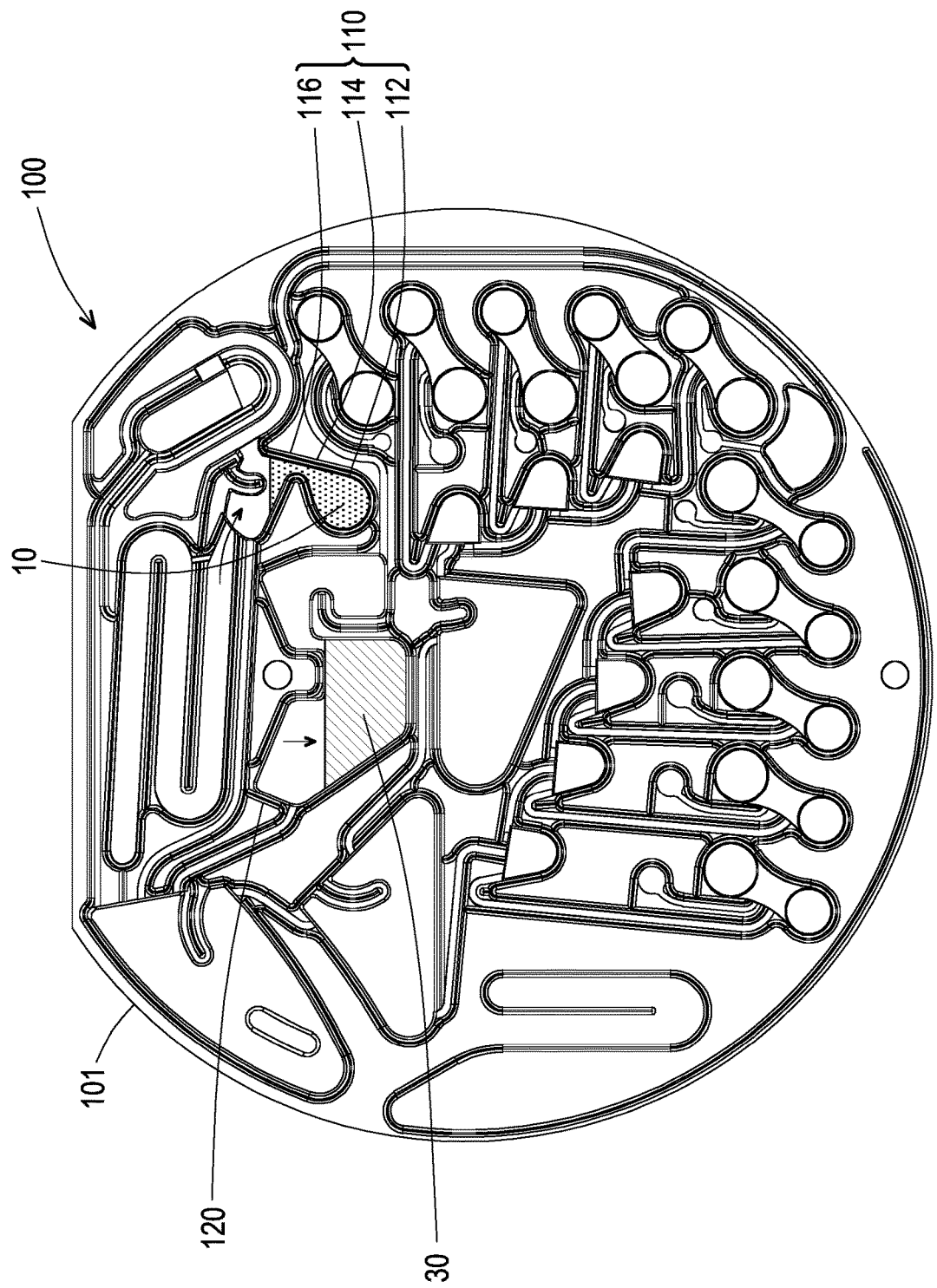

The sample 10 enters the separation chamber 110 as shown in FIG. 4 after passing through the input flow channel 104 from the first injection chamber 102. In addition, the cartridge 100 further includes a fluid chamber 120 adapted for accommodating the fluid 30, and the fluid 30 in the fluid box 20 (FIG. 2A) may also flow into the fluid chamber 120 at this stage. The fluid 30 is, for example, a diluent.

Figure 5A:
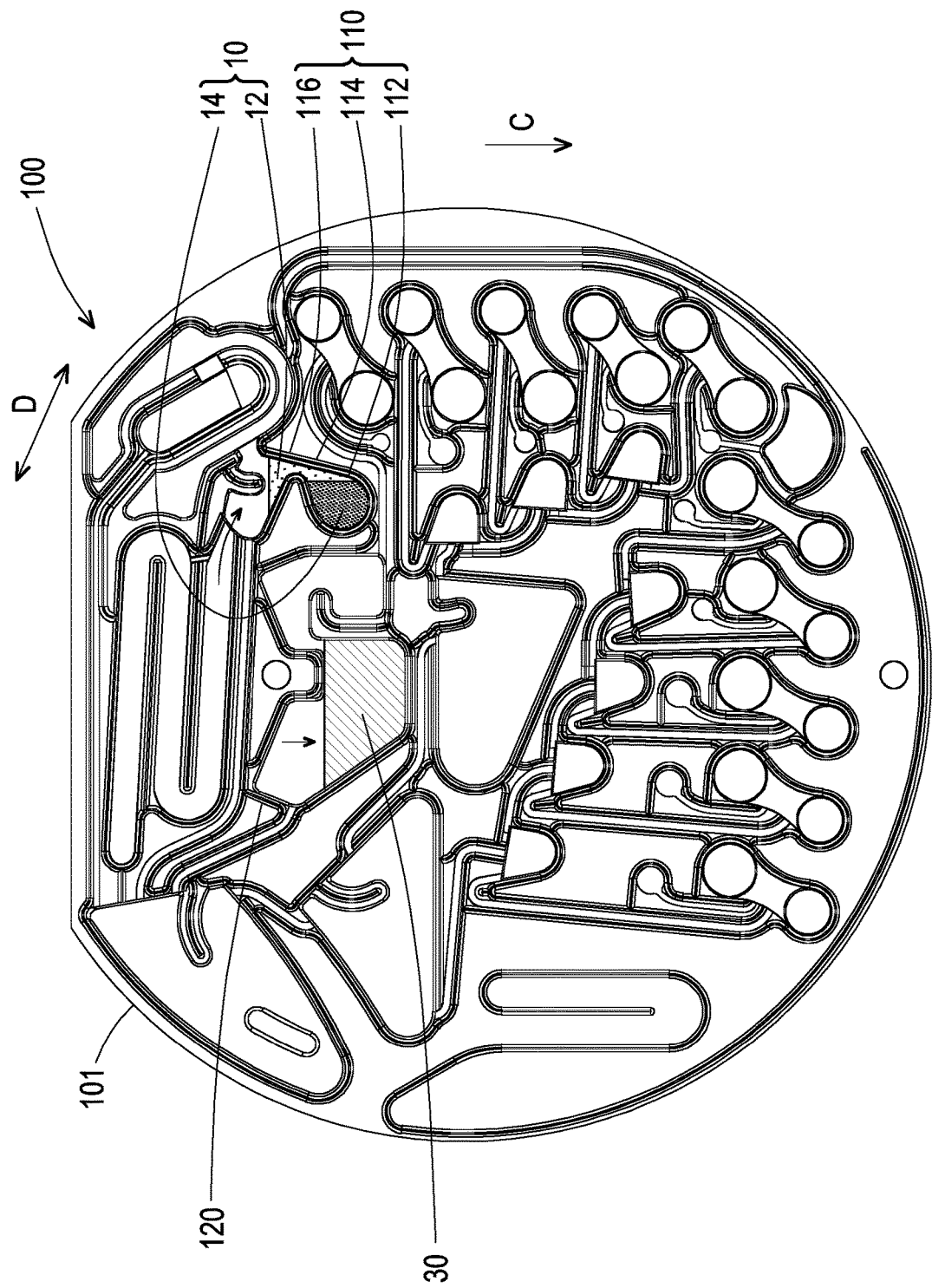

Referring to FIG. 5A, the separation chamber 110 includes a lower separation portion 112 and an upper separation portion 116, the upper separation portion 116 is connected to the input flow channel 104, and there is a connecting portion 114 between the lower separation portion 112 and the upper separation portion 116. The embodiment shown in FIG. 5A is described by taking the necked section as the connecting portion 114 as an example, that is, the width of the chamber body of the connecting portion 114 in the width direction D is relatively smaller than the width of the chamber body of the lower separation portion 112 or the upper separation portion 116 in the width direction D. The width direction D refers to the direction of the width that describes the connecting portion 114. At this stage, the cartridge 100 is subjected to the centrifugal force of the rotation of the first turntable 52 (FIG. 1), so that the first component 12 and the second component 14 are separated from the sample 10 in the separation chamber 110, and the density of the first component 12 is lower than the density of the second component 14. In this embodiment, the first component 12 is, for example, blood plasma, and the second component 14 is, for example, blood cells, but not limited thereto. The separated first component 12 is adapted to be located in the upper separation portion 116, and the separated second component 14 is adapted to be located corresponding to the lower separation portion 112.

Figure 5B:
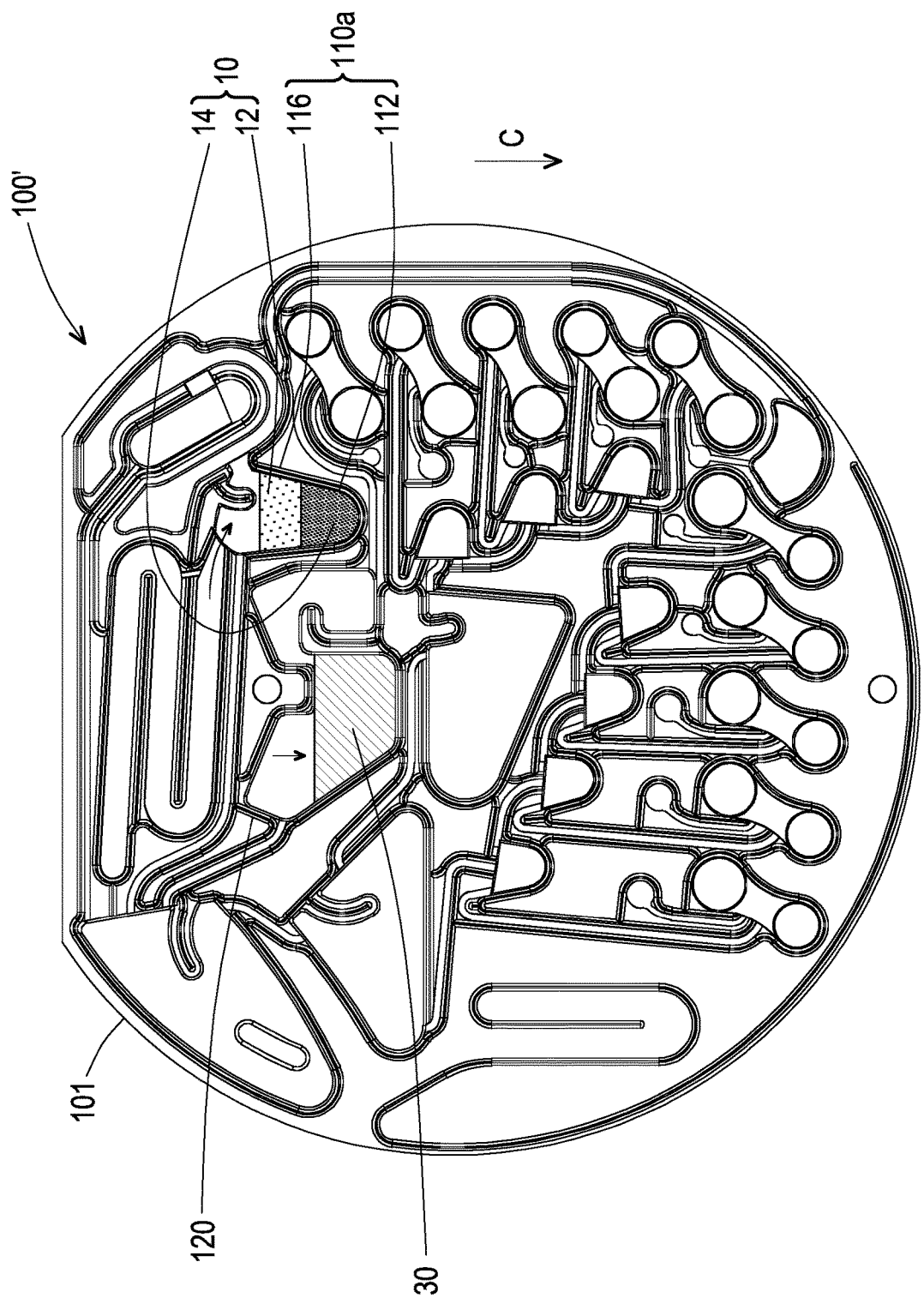

FIG. 5B is a schematic diagram of the cartridge of another embodiment of the disclosure. Referring to FIG. 5B, the difference between FIG. 5A and FIG. 5B is that in the cartridge 100' of FIG. 5B, the lower separation portion 112 of the separation chamber 110a is directly connected to the upper separation portion 116. That is, there is no connecting portion 114 of FIG. 5A. Of course, the forms of the separation chambers 110 and 110a are not limited thereto.

Figure 6:
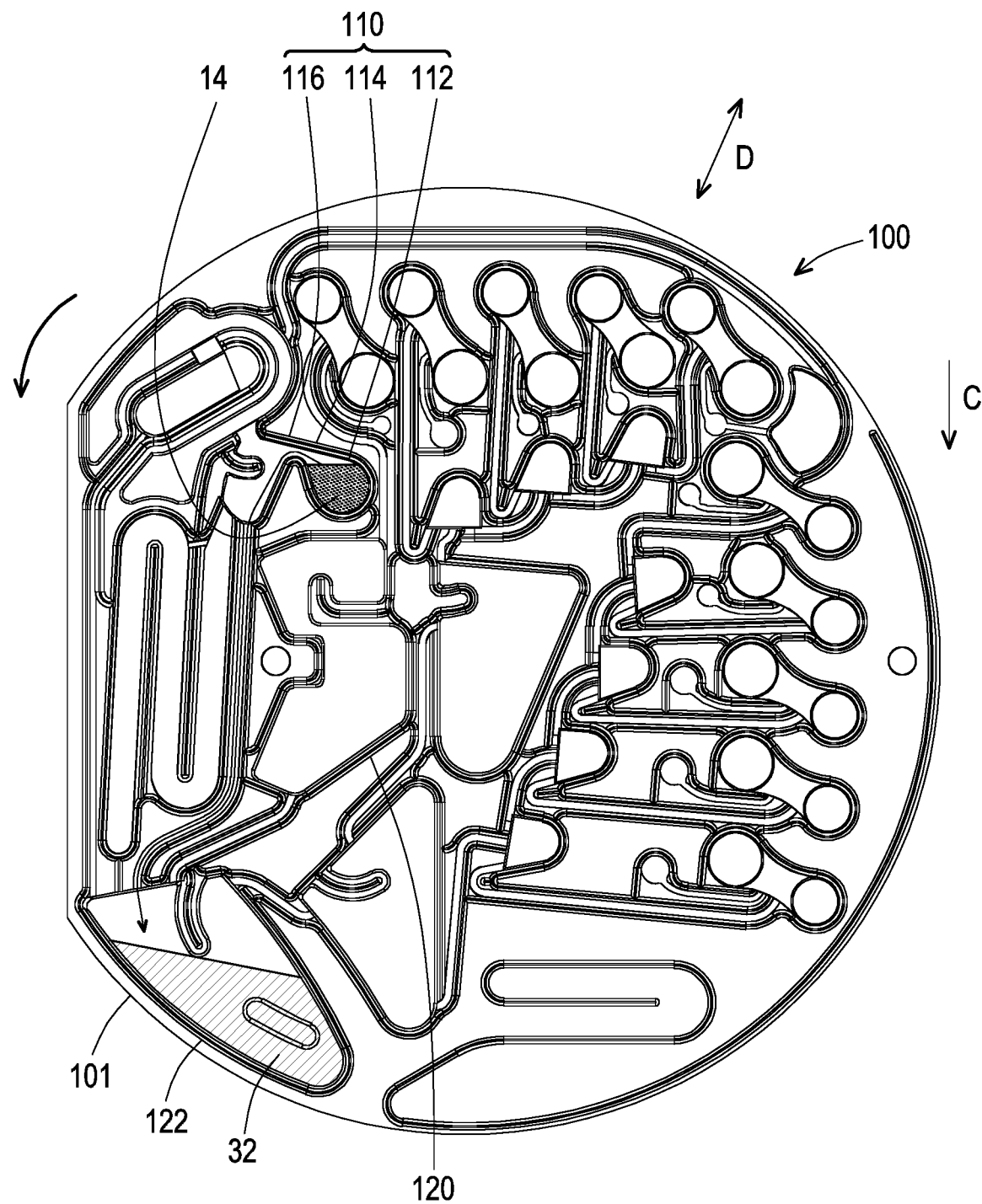

Next, referring to FIG. 6, the cartridge 100 further includes a collection chamber 122, and the upper separation portion 116 of the separation chamber 110 and the fluid chamber 120 are connected to the collection chamber 122. The collection chamber 122 and the fluid chamber 120 are located on the same side of the separation chamber 110 in the width direction D. The rotation of the second turntable 55 (FIG. 1) drives the cartridge 100 to turn counterclockwise, so that the collection chamber 122 of the cartridge 100 is approximately located in the centrifugal direction C of the separation chamber 110 and the fluid chamber 120. That is, the collection chamber 122 is further away from the first rotary shaft 53 (FIG. 1) than the separation chamber 110 and the fluid chamber 120. Therefore, the first component 12 located in the separation chamber 110 and the fluid 30 located in the fluid chamber 120 flow to the collection chamber 122 at this stage to be mixed in the collection chamber 122 to form a mixed liquid 32. At this stage, the side wall of the connecting portion 114 is slightly higher than or equal to the liquid level of the second component 14 due to the design (e.g. width or shape) of the chamber body of the connecting portion 114, so that the second component 14 may be prevented from flowing toward the collection chamber 122.

Figure 7:
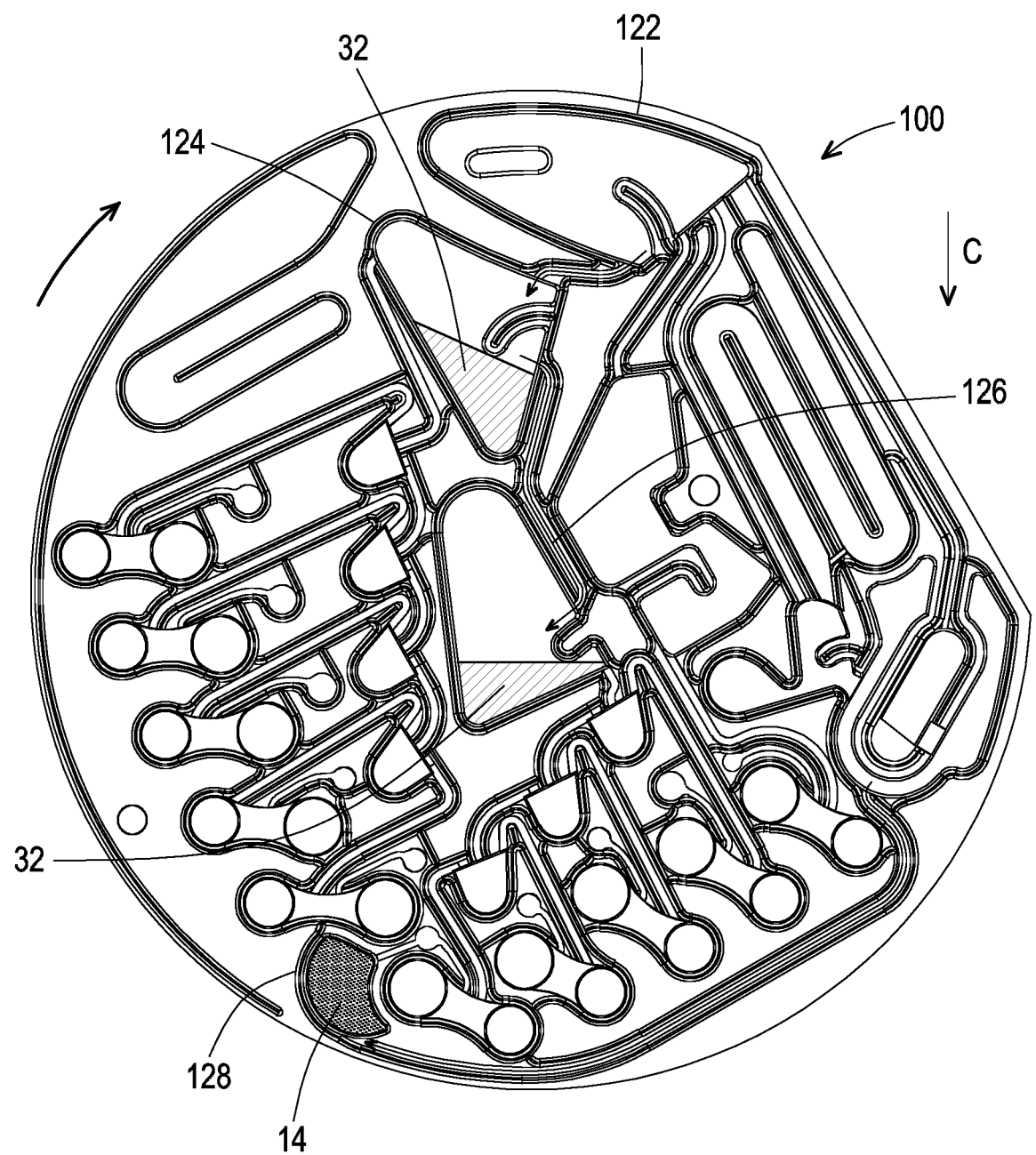

Next, referring to FIG. 7, the cartridge 100 further includes a first quantitative chamber 124 and a second quantitative chamber 126. The first quantitative chamber 124 is connected to the collection chamber 122. The second quantitative chamber 126 is connected to the first quantitative chamber 124, and the second quantitative chamber 126 is located on the same side of the first quantitative chamber 124 and the collection chamber 122. The first quantitative chamber 124 is, for example, connected between the collection chamber 122 and the second quantitative chamber 126.

At this stage, the cartridge 100 is driven by the second turntable 55 to turn clockwise, so that the first quantitative chamber 124 is approximately located in the centrifugal direction C of the collection chamber 122, and the second quantitative chamber 126 is approximately located in the centrifugal direction C of the first quantitative chamber 124. That is, the first quantitative chamber 124 is further away from the first rotary shaft 53 (FIG. 1) than the collection chamber 122, and the second quantitative chamber 126 is further away from the first rotary shaft 53 (FIG. 1) than the first quantitative chamber 124. Therefore, the mixed liquid 32 in the collection chamber 122 first flows to the first quantitative chamber 124, and the excess mixed liquid 32 then flows to the second quantitative chamber 126. In addition, at this stage, the second component 14 in the lower separation portion 112 of the separation chamber 110 may flow to a temporary storage chamber 128 and does not participate in this detection.

Figure 8:
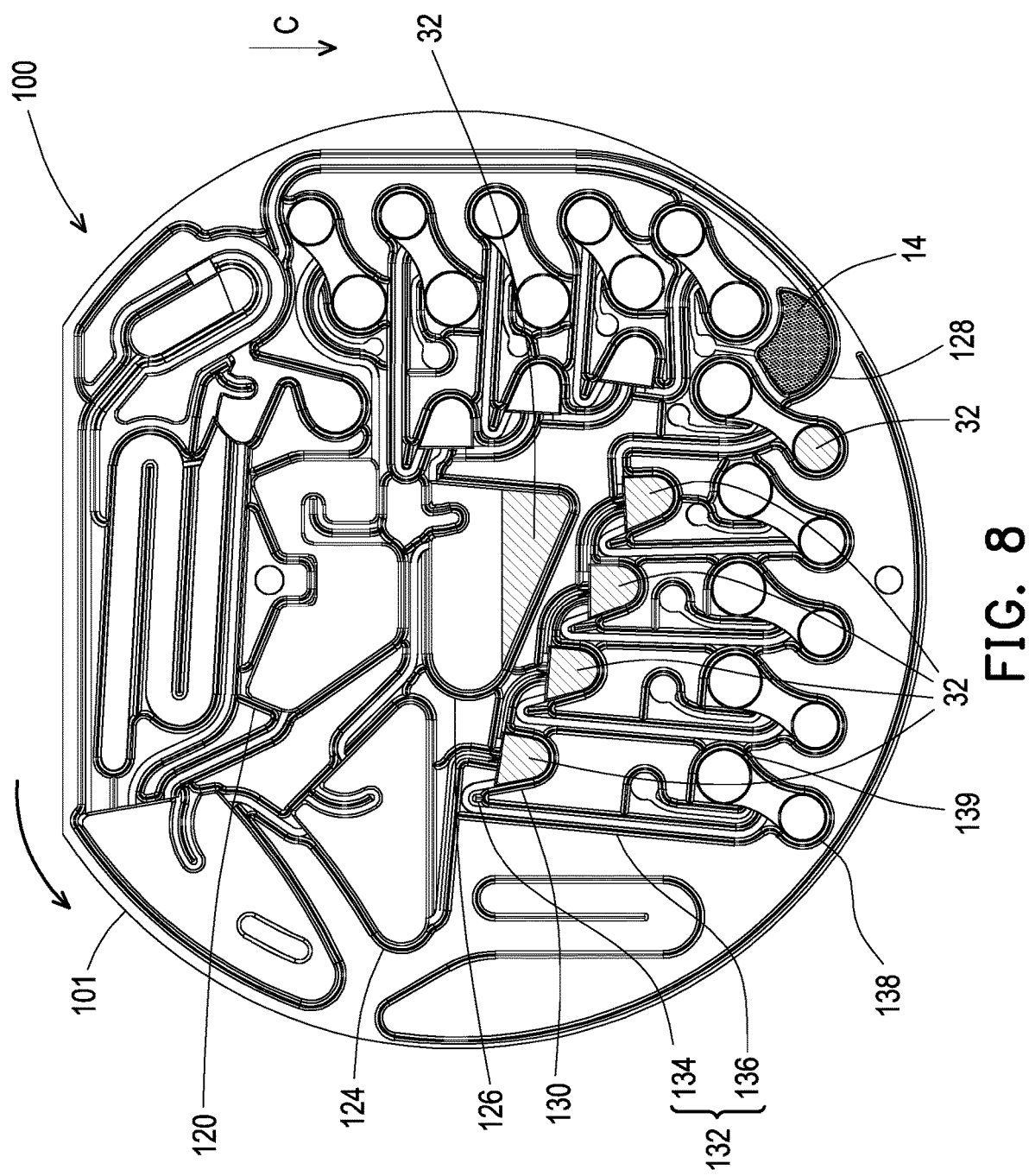

Referring to FIG. 8, the cartridge 100 further includes at least one set of a third quantitative chamber 130, a first connecting duct 132, and first detection chambers 138 and 139. The third quantitative chamber 130 is connected to the first quantitative chamber 124. The first connecting duct 132 is connected between the third quantitative chamber 130 and the first detection chambers 138 and 139, and the first detection chambers 138 and 139 are connected to each other.

The first connecting duct 132 is, for example, a curved duct, which includes a first section 134 and a second section 136 that are connected in a bending manner, the first section 134 is connected to the third quantitative chamber 130, and the second section 136 is connected to the first detection chambers 138 and 139. The first section 134 and the first quantitative chamber 124 are located on the same side of the third quantitative chamber 130. The first detection chambers 138 and 139 are, for example, disposed on different sides of the accommodating portion 105. In one embodiment, compared to the first injection chamber 102 or the collection chamber 122, the first detection chambers 138 and 139 are further away from the first rotary shaft 53 (FIG. 1) in the centrifugal direction C.

At this stage, the cartridge 100 is driven by the second turntable 55 to turn counterclockwise, so that the third quantitative chamber 130 is approximately located in the centrifugal direction C of the first quantitative chamber 124. That is, the third quantitative chamber 130 is further away from the first rotary shaft 53 (FIG. 1) than the first quantitative chamber 124. Therefore, the mixed liquid 32 in the first quantitative chamber 124 flows to the third quantitative chamber 130, and then flows to the next third quantitative chamber 130 in sequence. In addition, since the junction of the first section 134 and the second section 136 of the first connecting duct 132 is located above the third quantitative chamber 130 in FIG. 8, the mixed liquid 32 in the four third quantitative chambers 130 does not flow to the corresponding four sets of first detection chambers 138 and 139 through the first connecting duct 132 connected to the left of the four third quantitative chambers 130 at this stage. However, at this stage, after the mixed liquid 32 is filled into the four third quantitative chambers 130, the excess portion flows to the first detection chamber 138 on the furthest right in FIG. 8. That is to say, if there is mixed liquid 32 in the first detection chamber 138 on the furthest right of FIG. 8, it may be used to determine whether the four third quantitative chambers 130 have sufficient amount.

Figure 9:
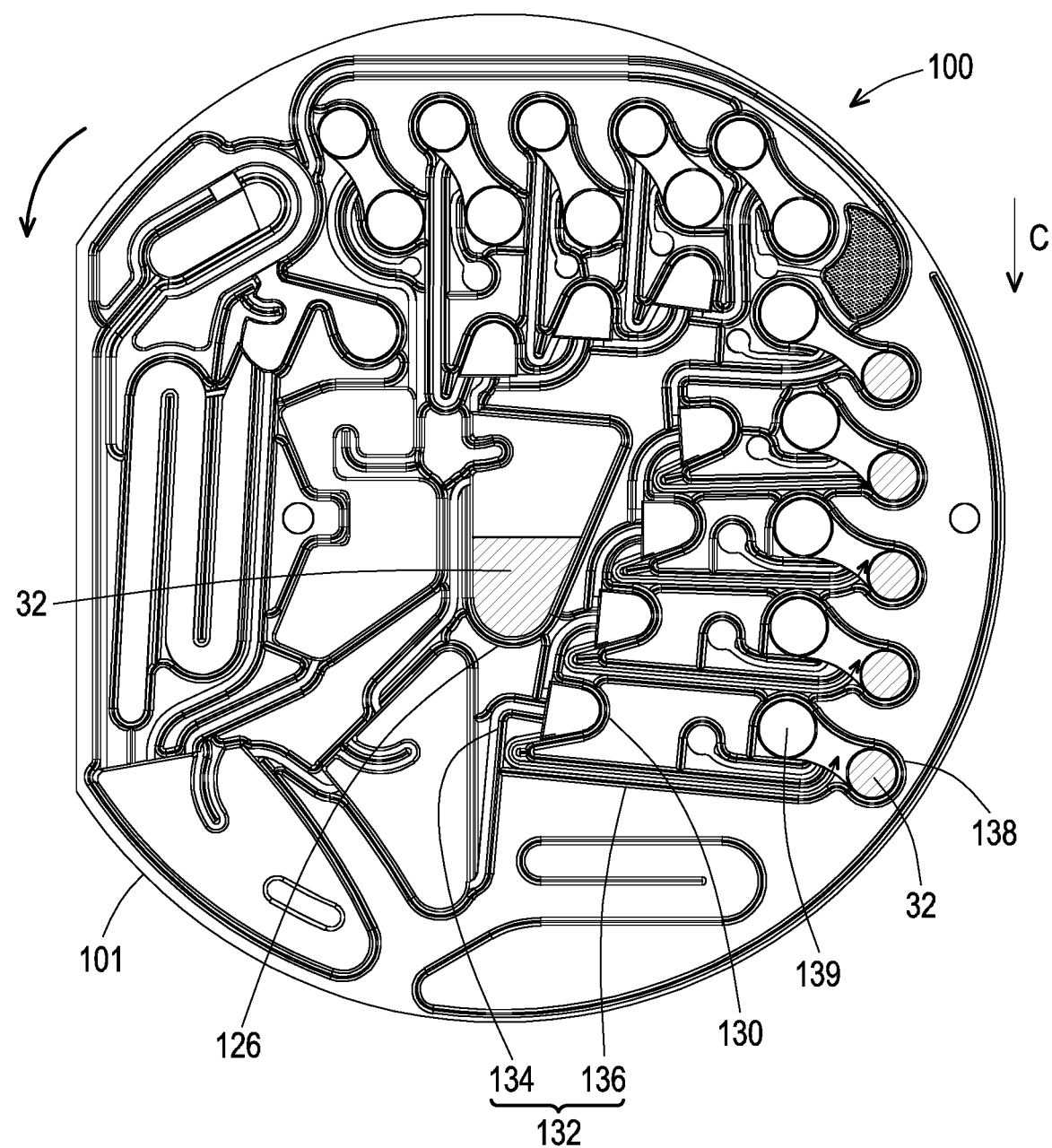

Referring to FIG. 9, the cartridge 100 is driven by the second turntable 55 to turn counterclockwise, so that the first connecting duct 132 is approximately located in the centrifugal direction C of the third quantitative chamber 130. That is, the first connecting duct 132 is further away from the first rotary shaft 53 (FIG. 1) than the third quantitative chamber 130. Therefore, the mixed liquid 32 in the third quantitative chamber 130 passes through the bent connection between the first section 134 and the second section 136 of the first connecting duct 132, that is, flows toward the first detection chambers 138 and 139 through the first connecting duct 132.

Figure 10:
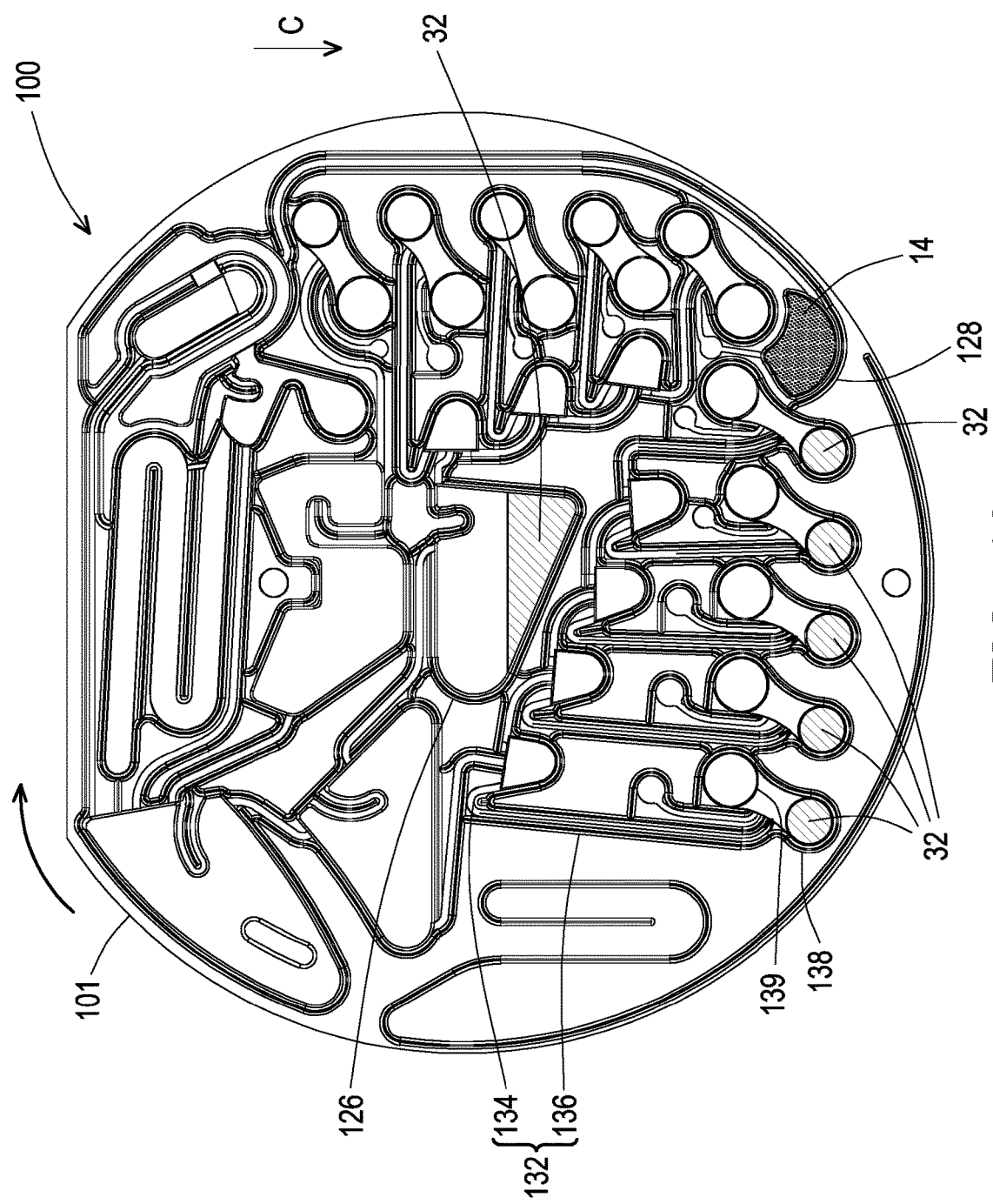

Next, referring to FIG. 10, the cartridge 100 is driven by the second turntable 55 to turn clockwise, so that the first detection chambers 138 and 139 are approximately located in the centrifugal direction C of the first connecting duct 132. That is, the first detection chambers 138 and 139 are further away from the first rotary shaft 53 (FIG. 1) than the first connecting duct 132. Therefore, the mixed liquid 32 in the first connecting duct 132 flows to the first detection chambers 138 and 139.

Figure 11:
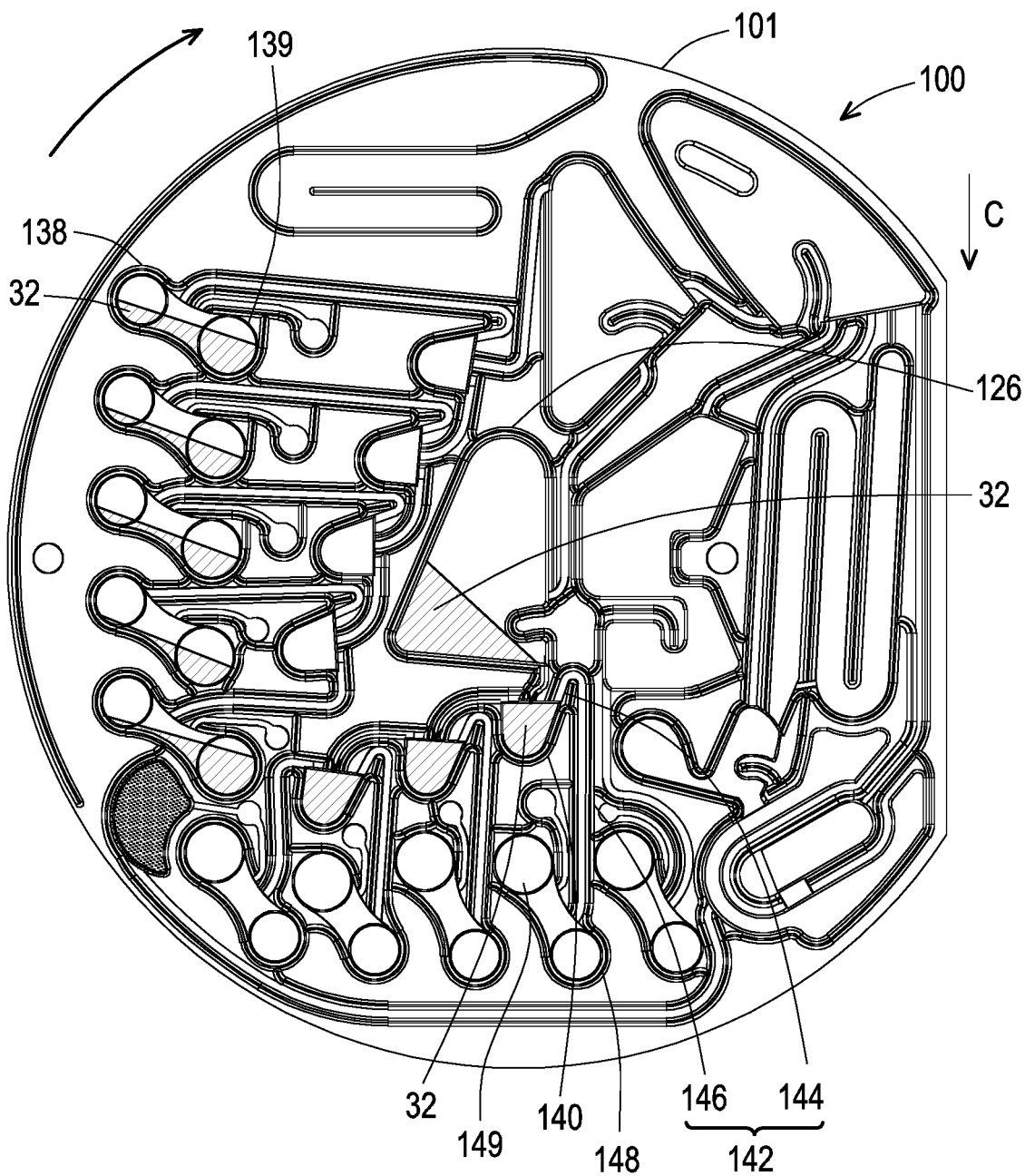

Referring to FIG. 11, the cartridge 100 further includes a fourth quantitative chamber 140, a second connecting duct 142, and second detection chambers 148 and 149. The fourth quantitative chamber 140 is connected to the second quantitative chamber 126. The second connecting duct 142 is connected to the fourth quantitative chamber 140. The second connecting duct 142 includes a third section 144 and a fourth section 146 connected in a bending manner. The third section 144 is connected to the fourth quantitative chamber 140. The second detection chambers 148 and 149 are connected to the fourth section 146, and the third section 144 and the second quantitative chamber 126 are located on the same side of the fourth quantitative chamber 140. The second detection chambers 148 and 149 are, for example, disposed on different sides of the accommodating portion 105. In one embodiment, compared to the first injection chamber 102 or the collection chamber 122, the second detection chambers 148 and 149 are further away from the first rotary shaft 53 (FIG. 1) in the centrifugal direction C.

The cartridge 100 is driven by the second turntable 55 to turn clockwise, so that the fourth quantitative chamber 140 is approximately located in the centrifugal direction C of the second quantitative chamber 126. That is, the fourth quantitative chamber 140 is further away from the first rotary shaft 53 (FIG. 1) than the second quantitative chamber 126. Therefore, the mixed liquid 32 in the second quantitative chamber 126 flows to the fourth quantitative chamber 140. In addition, since the third section 144 of the second connecting duct 142 is located above the fourth quantitative chamber 140 in FIG. 11, the mixed liquid 32 does not flow to the second connecting duct 142 at this stage.

Figure 12:
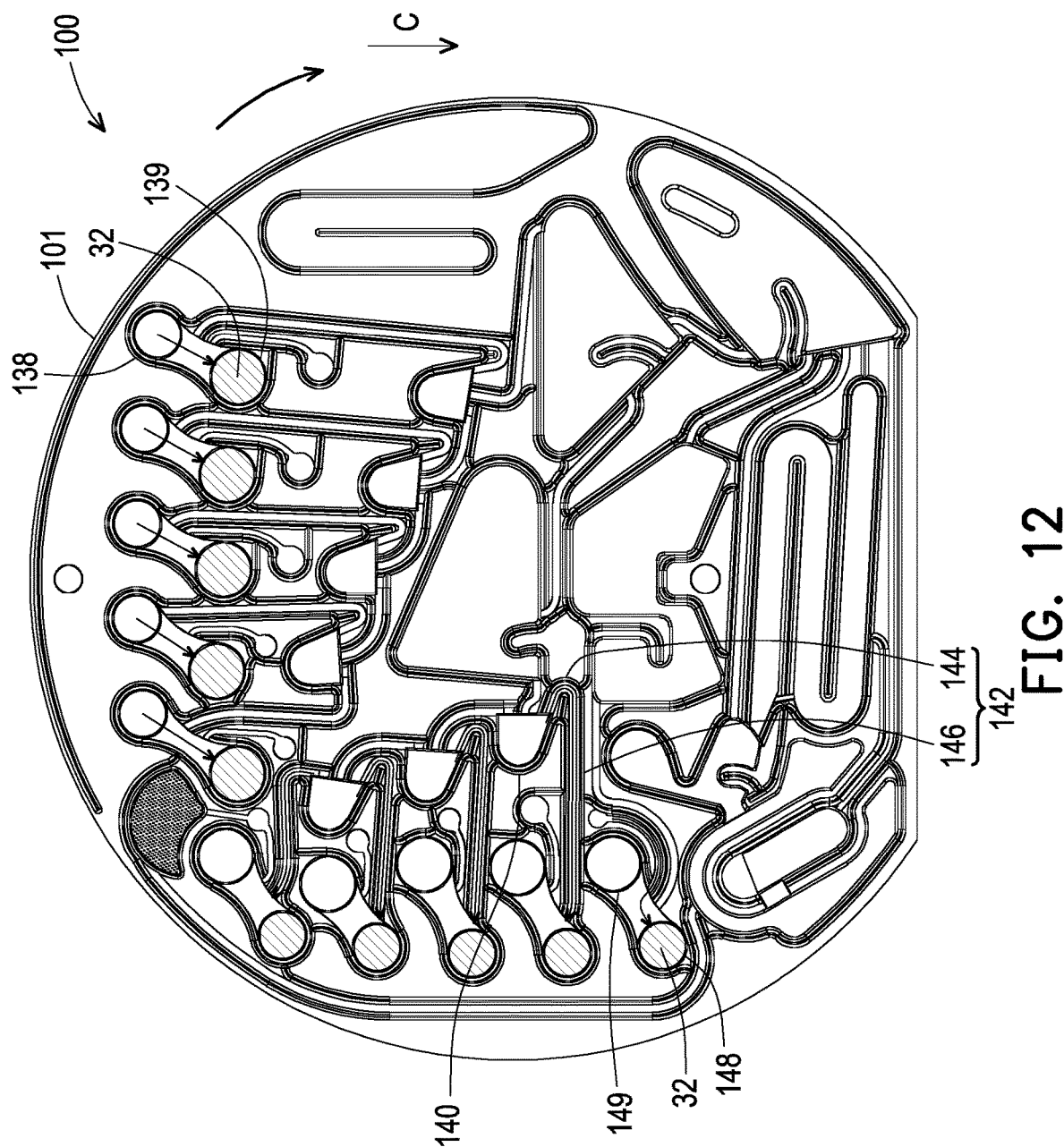

Referring to FIG. 12, the cartridge 100 is driven by the second turntable 55 to turn clockwise, so that the second connecting duct 142 and the second detection chambers 148 and 149 are approximately located in the centrifugal direction C of the fourth quantitative chamber 140. That is, the second connecting duct 142 and the second detection chambers 148 and 149 are further away from the first rotary shaft 53 (FIG. 1) than the fourth quantitative chamber 140. Therefore, the mixed liquid 32 in the fourth quantitative chamber 140 flows to the second connecting duct 142 and the second detection chambers 148 and 149.

Figure 13:
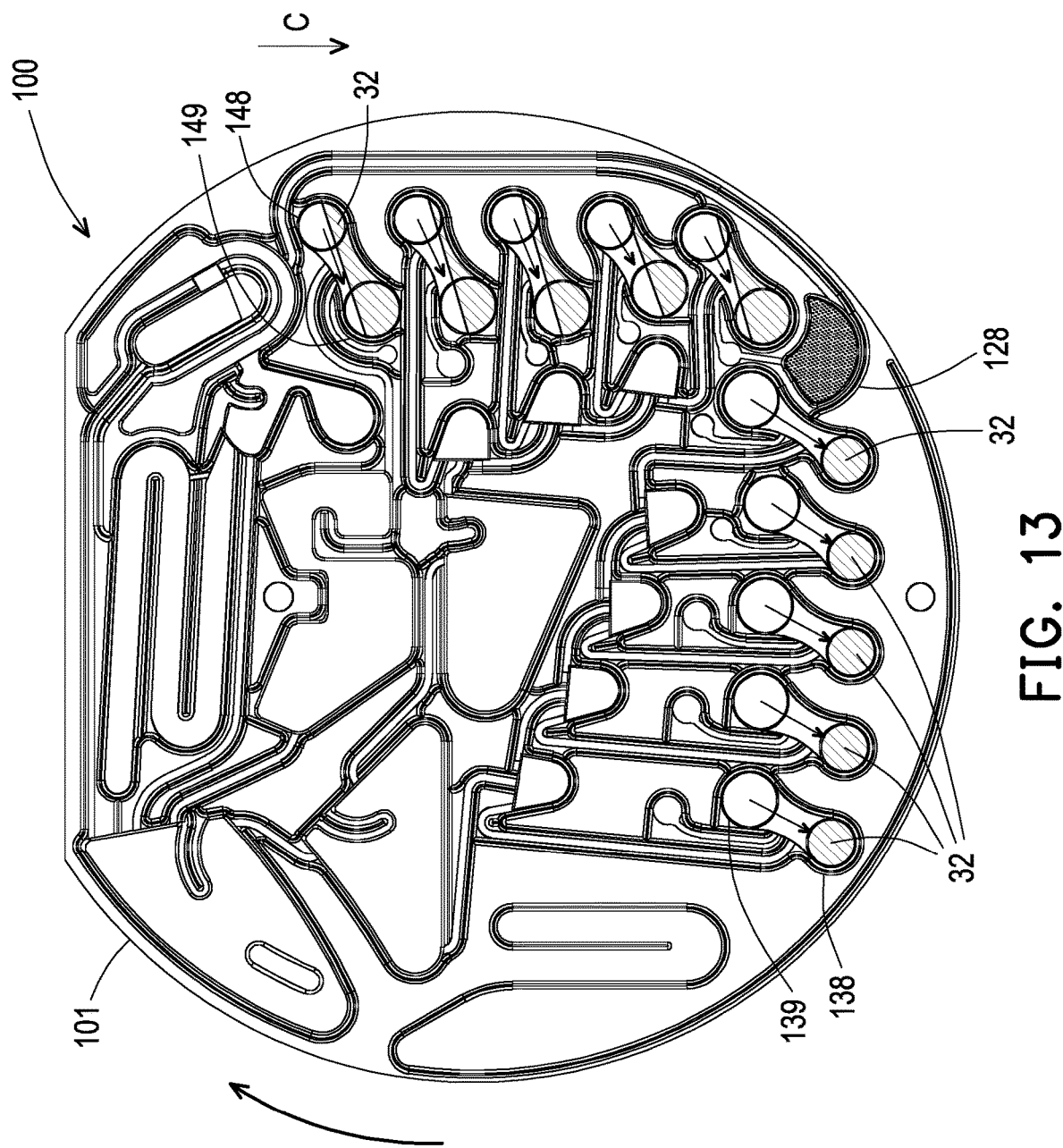

Referring to FIG. 13, the cartridge 100 is driven by the second turntable 55 to turn clockwise, so that the mixed liquid 32 in the first detection chambers 138 and 139 flows to the first detection chambers 138 and 139, and the mixed liquid 32 in the second detection chambers 148 and 149 flows to the second detection chambers 148 and 149. Likewise, the second detection chambers 148 and 149 may contain reagents or medicines, and the mixed liquid 32 in the second detection chambers 148 and 149 is mixed with the reagents or medicines during the flow process of the two second detection chambers 148 and 149.

Figure 14:
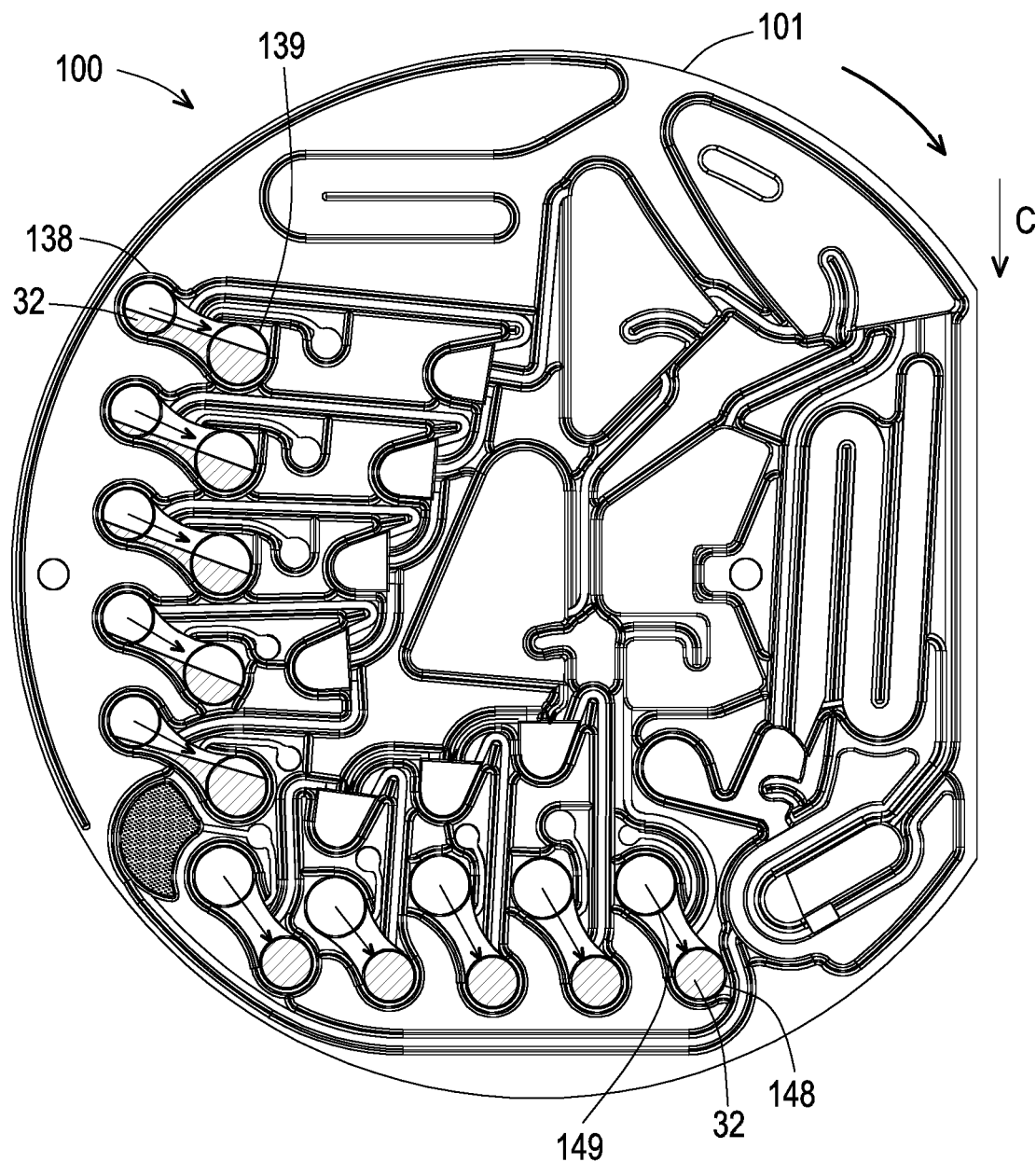

Referring to FIG. 14, the cartridge 100 is driven by the second turntable 55 to turn clockwise, so that the mixed liquid 32 in the first detection chambers 138 and 139 flows to the first detection chambers 138 and 139, and the mixed liquid 32 in the second detection chambers 148 and 149 flows to the second detection chambers 148 and 149. FIG. 13 and FIG. 14 are repeated several times, until the mixed liquid 32 in the first detection chambers 138 and 139 and the second detection chambers 148 and 149 are evenly mixed with the reagent or medicine, then detection may be performed.

It is explained here that the mixed liquid 32 in one of the first detection chambers 138 and 139 is subjected to centrifugal force and flows to the other of the first detection chambers 138 and 139, at least one of the first detection chambers 138 and 139 may contain reagents or medicines, and the mixed solution 32 is mixed with the reagents or medicines during the flow process of the two first detection chambers 138 and 139. In one embodiment, the reagents or medicines may be pre-filled in the first detection chamber 139, the mixed solution 32 in the first detection chamber 138 (as shown in FIG. 10) may flow to the first detection chamber 139 (as shown in FIG. 11 to FIG. 12) due to the change of rotational direction of the cartridge 100. Then, after the cartridge 100 changes its rotational direction once again, the mixed solution 32 reacted with the reagent or the medicine flows back to the first detection chamber 138 again (as shown in FIG. 13). In this way, after the mixed liquid 32 flows back and forth between the first detection chambers 138 and 139 by repeating the aforementioned steps one or more times, the fully reacted mixed liquid 32 may be optically detected in the first detection chamber 138.

Similarly, the mixed liquid 32 in one of the second detection chambers 148 and 149 is subjected to centrifugal force and flows to the other of the second detection chambers 148 and 149, at least one of the second detection chambers 148 and 149 may contain reagents or medicines, and the mixed solution 32 is mixed with the reagents or medicines during the flow process of the two second detection chambers 148 and 149. In one embodiment, the reagents or medicines may be pre-filled in the second detection chamber 149, the mixed solution 32 in the second detection chamber 148 (as shown in FIG. 12) may flow to the second detection chamber 149 (as shown in FIG. 13) due to the change of rotational direction of the cartridge 100. Then, after the cartridge 100 changes its rotational direction once again, the mixed solution 32 reacted with the reagent or the medicine flows back to the second detection chamber 148 again (as shown in FIG. 14). In this way, after the mixed liquid 32 flows back and forth between the second detection chambers 148 and 149 by repeating the aforementioned steps one or more times, the fully reacted mixed liquid 32 may be optically detected in the second detection chamber 148.

In addition, the reagents or medicines in the first detection chambers 138 and 139 and the reagents or medicines in the second detection chambers 148 and 149 may be different to perform different detections. In addition, although in this embodiment, the cartridge 100 uses the first detection chamber 138 and the second detection chamber 148 as the detection area, the first detection chamber 139 and the second detection chamber 149 may also be selected as the detection area. Furthermore, in addition to optical detection, the cartridge 100 may also perform electrochemical detection. In this case, the first detection chamber 138 and the second detection chamber 148 may be connected to electrodes. That is, the disposition in the first detection chambers 138 and 139 and the second detection chambers 148 and 149 may be adjusted according to the difference of detection methods.

Returning to FIG. 2B, in this embodiment, the upper cover 180 further includes air escape holes 186 and 188, and the air escape holes 186 and 188 are respectively spatially connected to at least one chamber or flow channel of the main body 101. For example, the air escape hole 186 may be spatially connected to the first detection chambers 138 and 139 (FIG. 14) or the flow channel adjacent to it, so that the gas in the first detection chambers 138 and 139 may be discharged from the air escape hole 186; the air escape hole 188 may be spatially connected to the second detection chambers 148 and 149 (FIG. 14) or the flow channel adjacent to it, so that the gas in the second detection chambers 148 and 149 may be discharged from the air escape hole 188, to maintain the smoothness of the flow of the mixed liquid 32 in the first detection chambers 138 and 139 and the mixed liquid 32 in the second detection chambers 148 and 149.

The cartridge 100 of this embodiment may not only detect the first component 12 by separating the sample 10 into the first component 12 after injecting the sample 10, but may also directly inject the first component 12, and all the injected first components 12 may be used for testing, so as to avoid waste of the specimen. For example, before injecting the specimen into the cartridge 100, the first component 12 is separated from the sample 10 through an external instrument, or the second component 14 (as shown in FIG. 7) placed in the temporary storage chamber 128 that is not used in the aforementioned embodiment may be used for other purposes. The flow process of the first component 12 in the cartridge 100 is described below.

Figure 16:
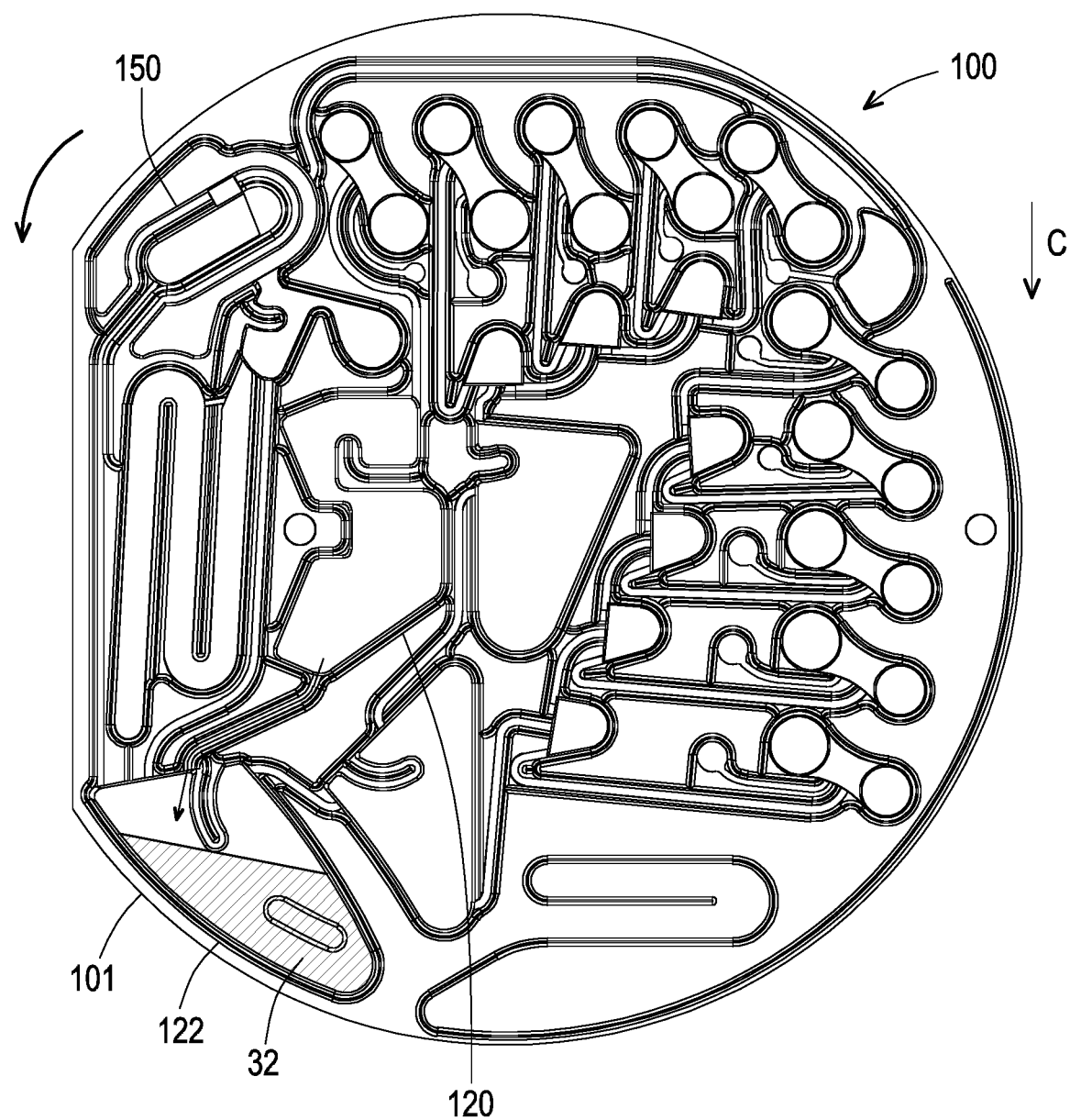

FIG. 15 to FIG. 16 are schematic diagrams of the flow of the first component in the cartridge of FIG. 2A to the collection chamber. Referring to FIG. 15, firstly, the first component 12 is injected into the second injection chamber 150. At this stage, the fluid 30 also flows into the fluid chamber 120 (similar to the embodiment shown in FIG. 4).

Next, referring to FIG. 16, the second injection chamber 150 is connected to the collection chamber 122, and the collection chamber 122 is located on the same side of the fluid chamber 120 and the second injection chamber 150. Therefore, the second turntable 55 (FIG. 1) is turned counterclockwise, so that the collection chamber 122 of the cartridge 100 is approximately located in the centrifugal direction C of the second injection chamber 150 and the fluid chamber 120. That is, the collection chamber 122 is further away from the first rotary shaft 53 (FIG. 1) than the second injection chamber 150 and the fluid chamber 120. Therefore, the first component 12 located in the second injection chamber 150 and the fluid 30 located in the fluid chamber 120 flow to the collection chamber 122 at this stage to be mixed in the collection chamber 122 to form the mixed liquid 32. In one embodiment, compared to the second injection chamber 150 or the collection chamber 122, the first detection chambers 138 and 139 are further away from the first rotary shaft 53 (FIG. 1) in the centrifugal direction C. Then, the process of FIG. 7 to FIG. 14 is performed to detect the first component 12.

Compared with directly injecting the first component 12 into the first injection chamber 102, which subsequently flows to the separation chamber 110, and only a portion of the first component 12 flows to the collection chamber 122, wasting the first component 12 remaining in the lower separation portion 112 of the collection chamber 122. The cartridge 100 of the embodiment provides a second injection chamber 150 specially used for injecting the first component 12. The first component 12 in the second injection chamber 150 may all flow into the collection chamber 122, and the injection amount of the first component 12 may be close to 50% to 60% of the amount of the sample 10 to be injected, effectively avoiding waste of specimen. In addition, no matter whether the first component 12 in the mixed liquid 32 comes from the separation chamber 110 or from the second injection chamber 150, the flow path of the mixed liquid 32 after the collection chamber 122 is the same, which may effectively simplify the design.

Figure 17:
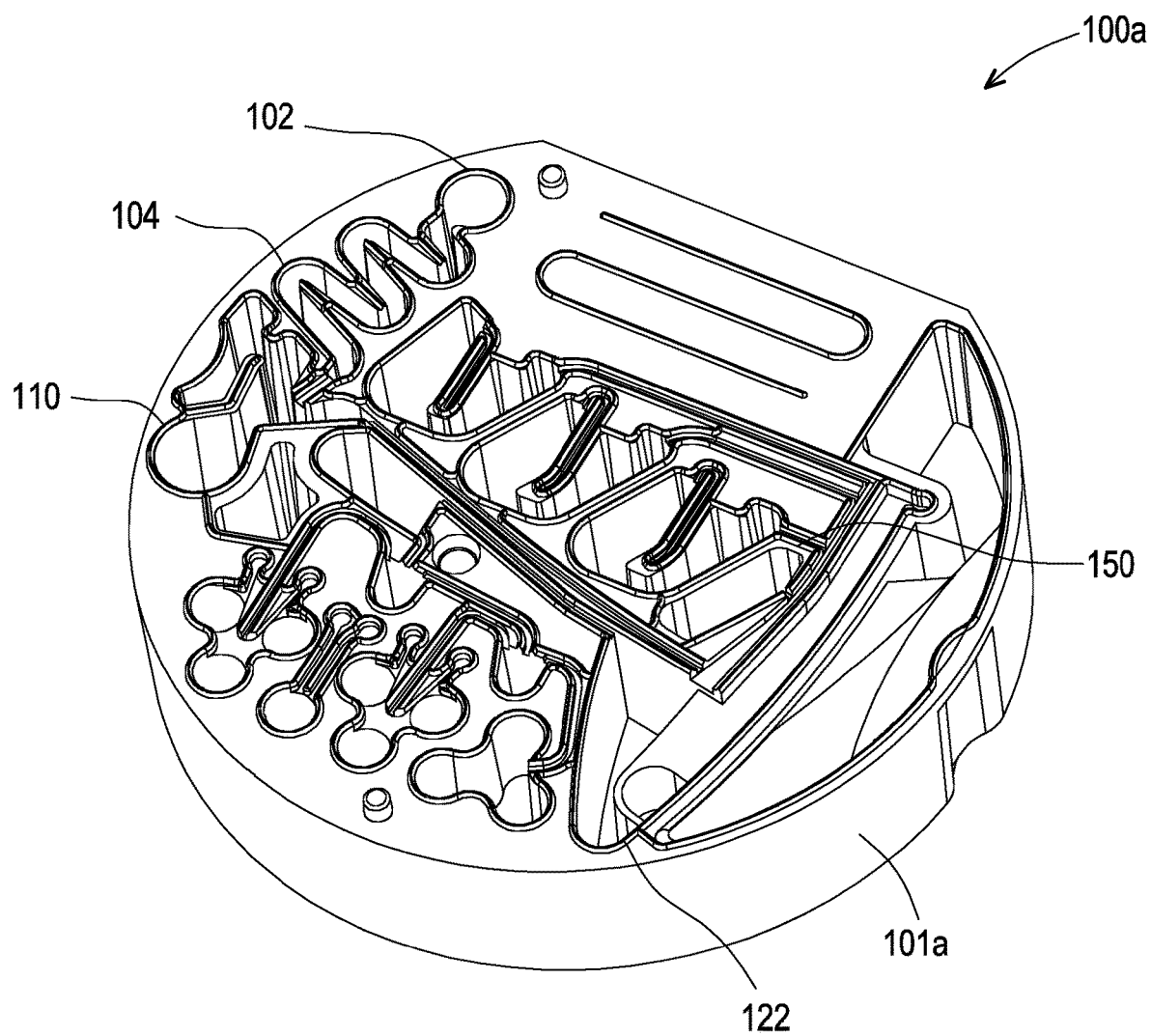
FIG. 17 is a schematic diagram of a main body of a cartridge according to another embodiment of the disclosure.

FIG. 17 is a schematic diagram of a main body of a cartridge according to another embodiment of the disclosure. Referring to FIG. 17, the flow channel design of the cartridge 100a of this embodiment is slightly different from that of the cartridge 100 of the previous embodiment, but has a similar concept to the cartridge 100 of the previous embodiment. The cartridge 100a of the embodiment may also be disposed on the second turntable 55 of the biological detection system 50 of FIG. 1. In the following embodiment, the reference numerals and a part of the contents of the above embodiments are used, and the same reference numerals are used to denote the same or similar elements, and the description of the same technical contents is omitted.

In this embodiment, the main body 101a of the cartridge 100a includes a first injection chamber 102 and a second injection chamber 150. The first injection chamber 102 is connected to the separation chamber 110 through the input flow channel 104, and the separation chamber 110 is connected to the collection chamber 122. The second injection chamber 150 is connected to the collection chamber 122. The collection chamber 122 is connected to the first detection chambers 138 and 139.

Figure 18:
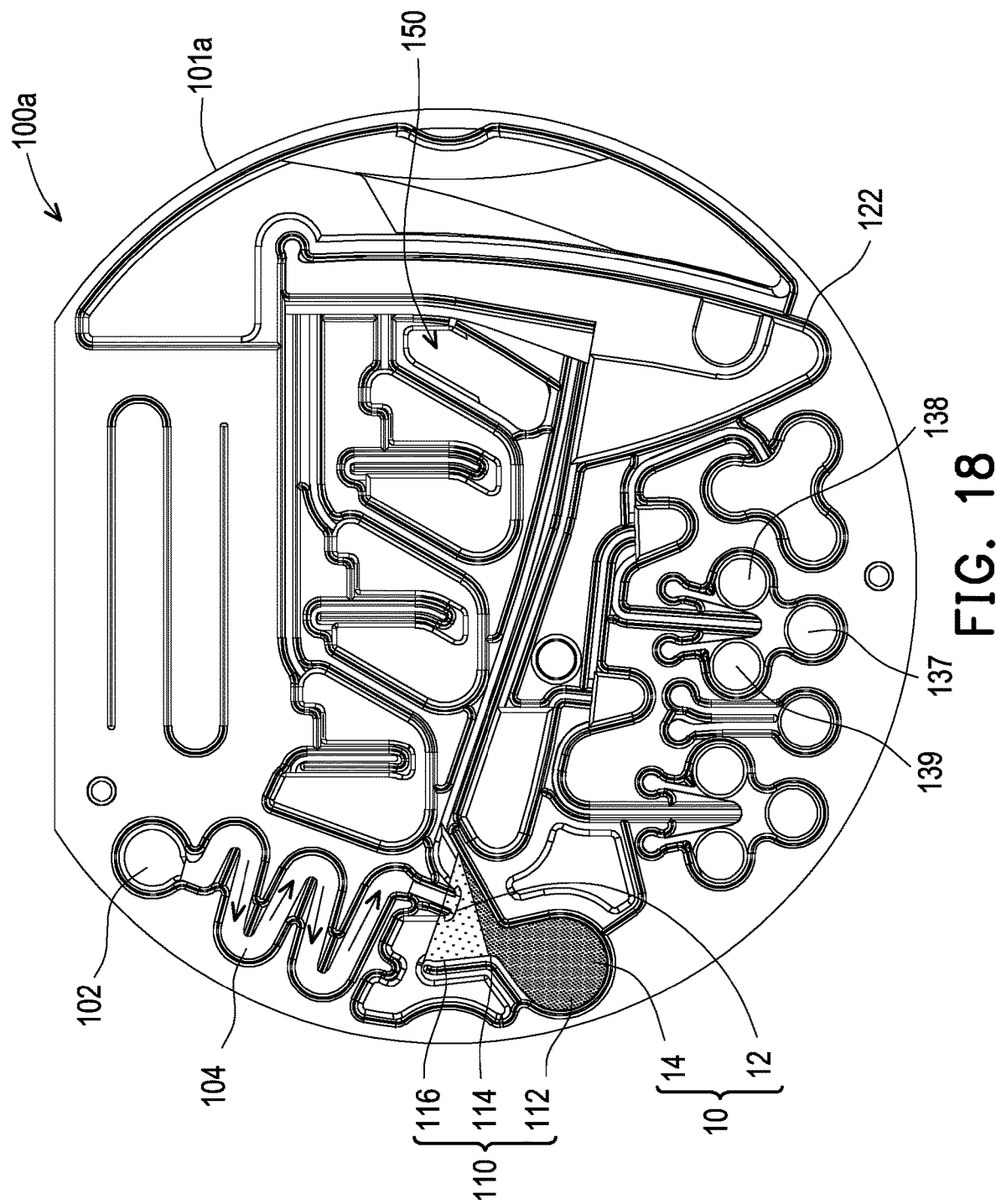
FIG. 18 to FIG. 19 are schematic diagrams of the flow of the sample in the cartridge of FIG. 17 to the collection chamber.
Figure 19:
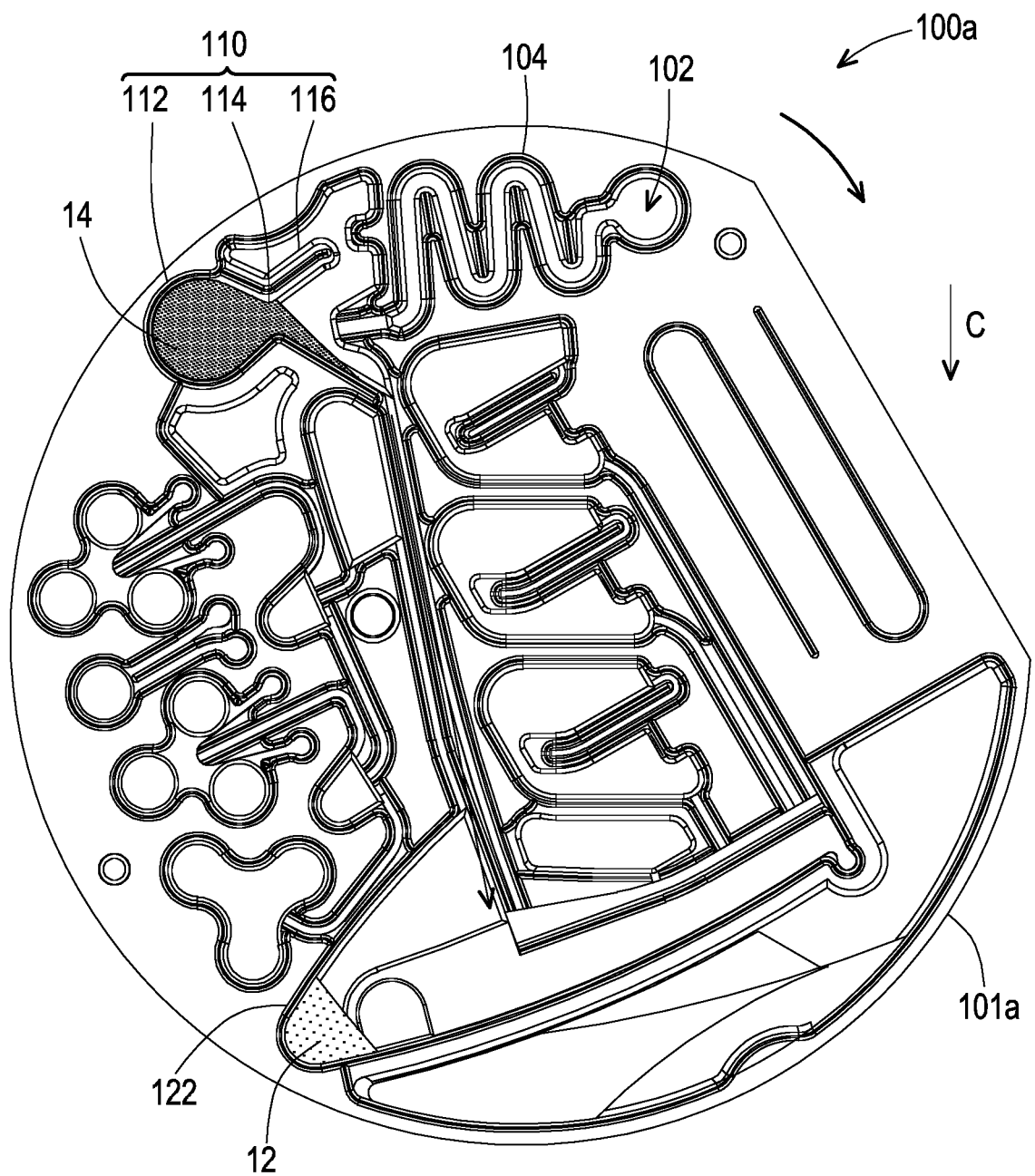

FIG. 18 to FIG. 19 are schematic diagrams of the flow of the sample in the cartridge of FIG. 17 to the collection chamber. Referring to FIG. 18, the sample 10 is injected from the first injection chamber 102 and then flows to the separation chamber 110 through the input flow channel, and is subjected to centrifugal force in the separation chamber 110 to be separated into the first component 12 and the second component 14 in the centrifugal direction C.

Referring to FIG. 19, the second turntable 55 (FIG. 1) is turned clockwise, so that the collection chamber 122 of the cartridge 100a is approximately located in the centrifugal direction C of the second injection chamber 150 and the fluid chamber 120. That is, the collection chamber 122 is further away from the first rotary shaft 53 (FIG. 1) than the separation chamber 110. Therefore, the first component 12 located in the separation chamber 110 flows to the collection chamber 122 at this stage. In a step not shown, the first component 12 in the collection chamber 122 may subsequently flow to the first detection chambers 137, 138, and 139 (marked in FIG. 18) through the rotation of the cartridge 100a for detection.

Figure 20:
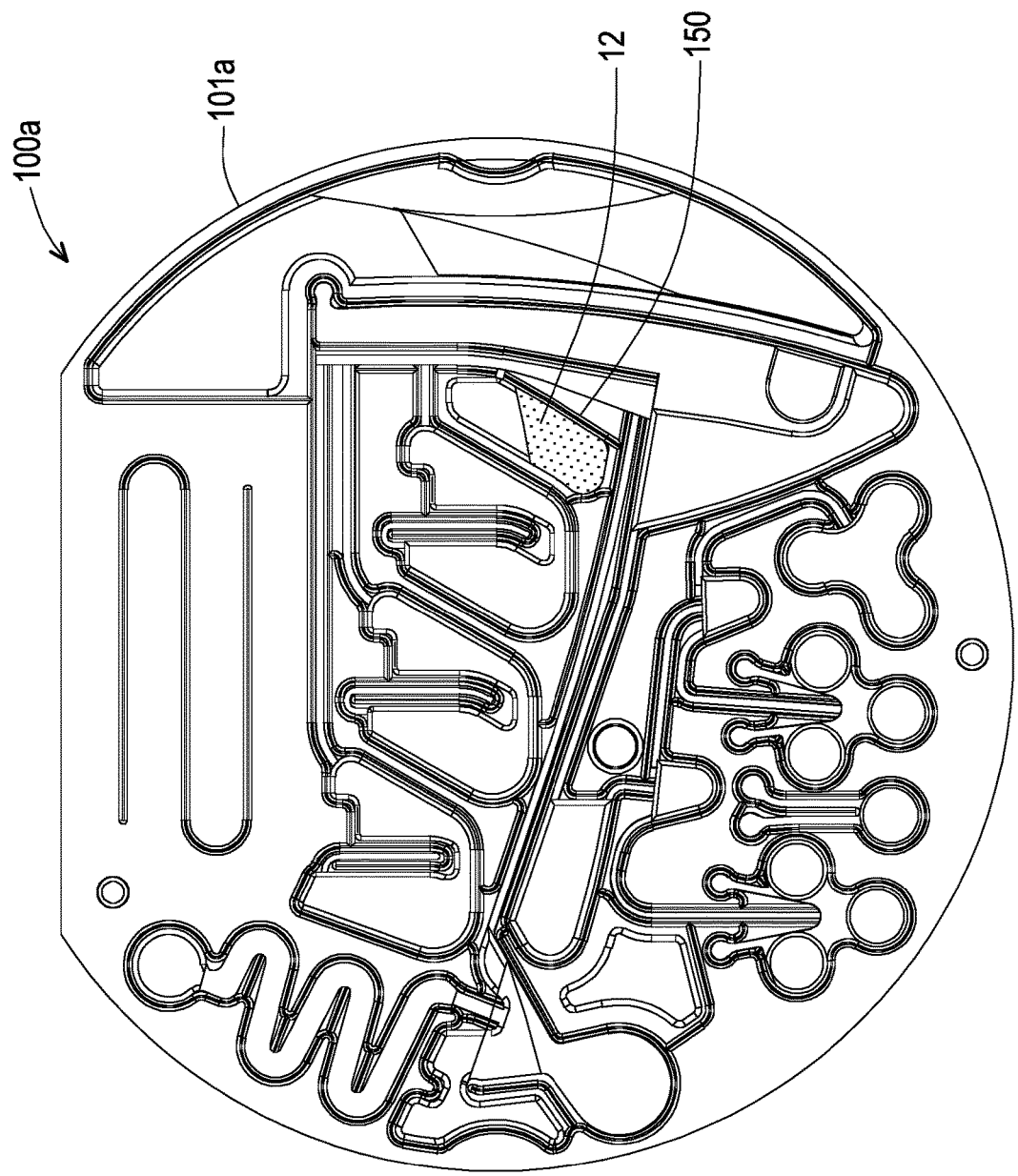
FIG. 20 to FIG. 21 are schematic diagrams of the flow of the first component in the cartridge of FIG. 17 to the collection chamber.
Figure 21:
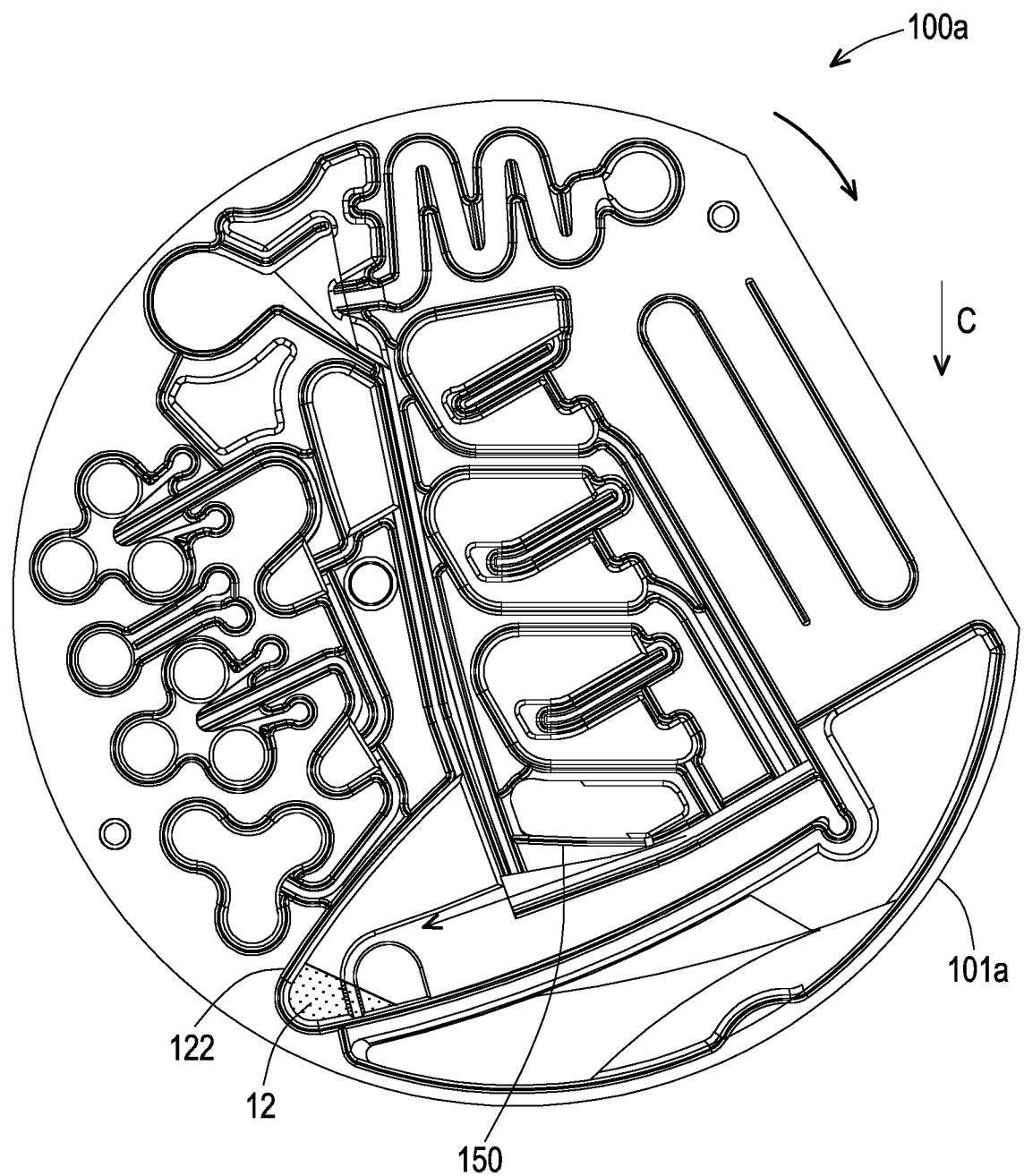

FIG. 20 to FIG. 21 are schematic diagrams of the flow of the first component in the cartridge of FIG. 17 to the collection chamber. Referring to FIG. 20, firstly, the first component 12 is injected into the second injection chamber 150. Next, referring to FIG. 21, the second turntable 55 (FIG. 1) is turned clockwise, so that the collection chamber 122 of the cartridge 100a is approximately located in the centrifugal direction C of the second injection chamber 150. That is, the collection chamber 122 is further away from the first rotary shaft 53 (FIG. 1) than the second injection chamber 150. Therefore, the first component 12 located in the second injection chamber 150 flows to the collection chamber 122 at this stage. In a step not shown, the first component 12 in the collection chamber 122 may subsequently flow to the first detection chambers 137, 138, and 139 (marked in FIG. 18) through the rotation of the cartridge 100a for detection.

Figure 22:
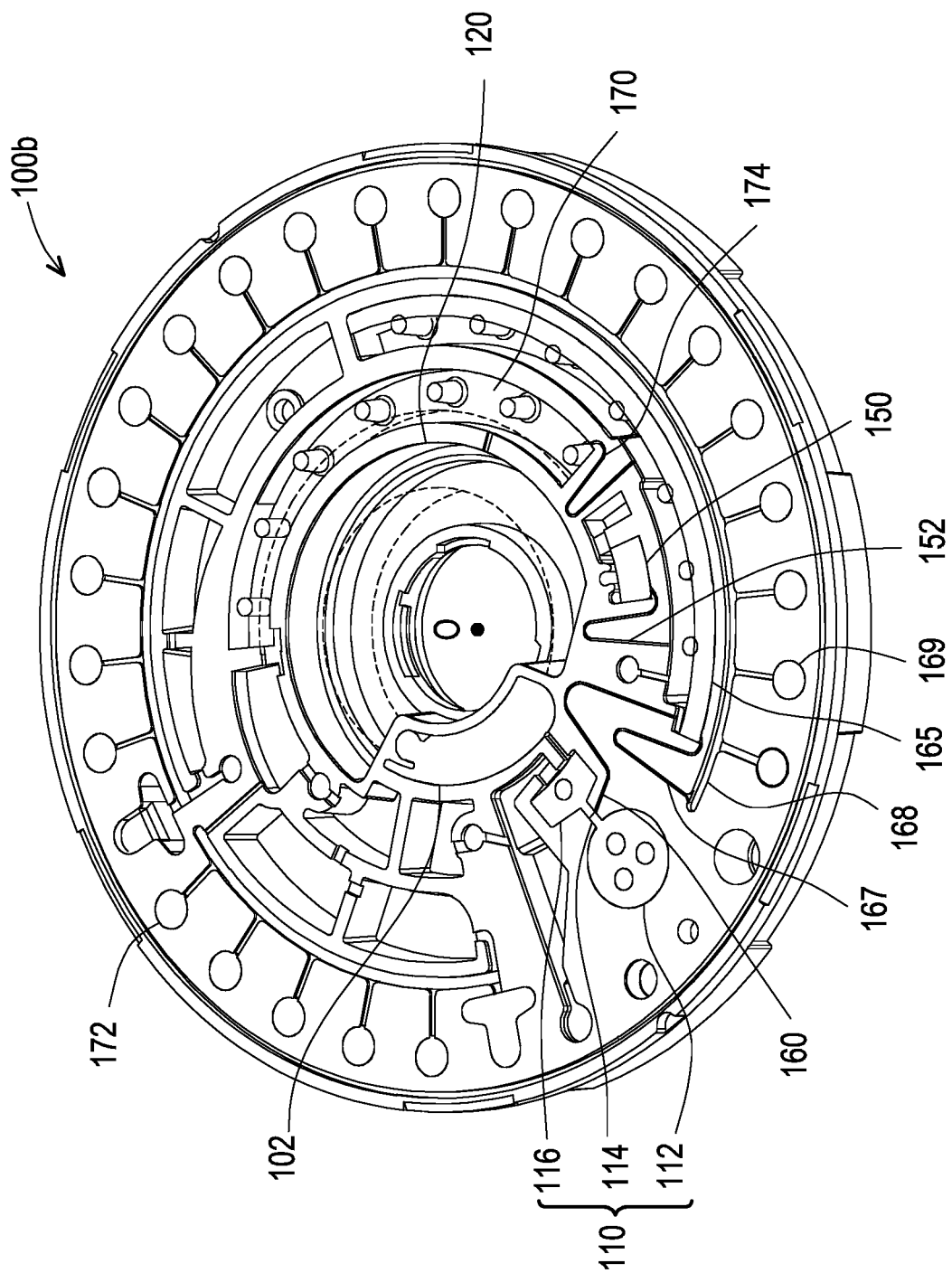
FIG. 22 is a schematic diagram of a main body of a cartridge according to another embodiment of the disclosure.

FIG. 22 is a schematic diagram of a main body of a cartridge according to another embodiment of the disclosure. Referring to FIG. 22, in this embodiment, the cartridge 100b utilizes centrifugal force and capillary force to make the fluid flow. In the following embodiment, the reference numerals and a part of the contents of the above embodiments are used, and the same reference numerals are used to denote the same or similar elements, and the description of the same technical contents is omitted.

In this embodiment, the main body 101b of the cartridge 100b at least includes a first injection chamber 102, a separation chamber 110, a collection chamber 165, a first detection chamber 169, and a second injection chamber 150. The cartridge 100b has a rotation center O, which is, for example, at the geometric center of the main body 101b. When the cartridge 100b rotates at a high speed with the rotation center O as the axis, the centrifugal force is greater than the capillary force, and the fluid 40 (FIG. 23) in the cartridge 100b flows in the centrifugal direction, that is, the radial direction of the cartridge 100b. When the cartridge 100b rotates at a low speed or does not rotate with the rotation center O as the axis, the capillary force is greater than the centrifugal force, and the fluid 40 in the cartridge 100b moves along the internal capillary. That is to say, the detection of the rotational speed of the cartridge 100b may be regarded as a switch for whether the capillary force may function.

Figure 23:
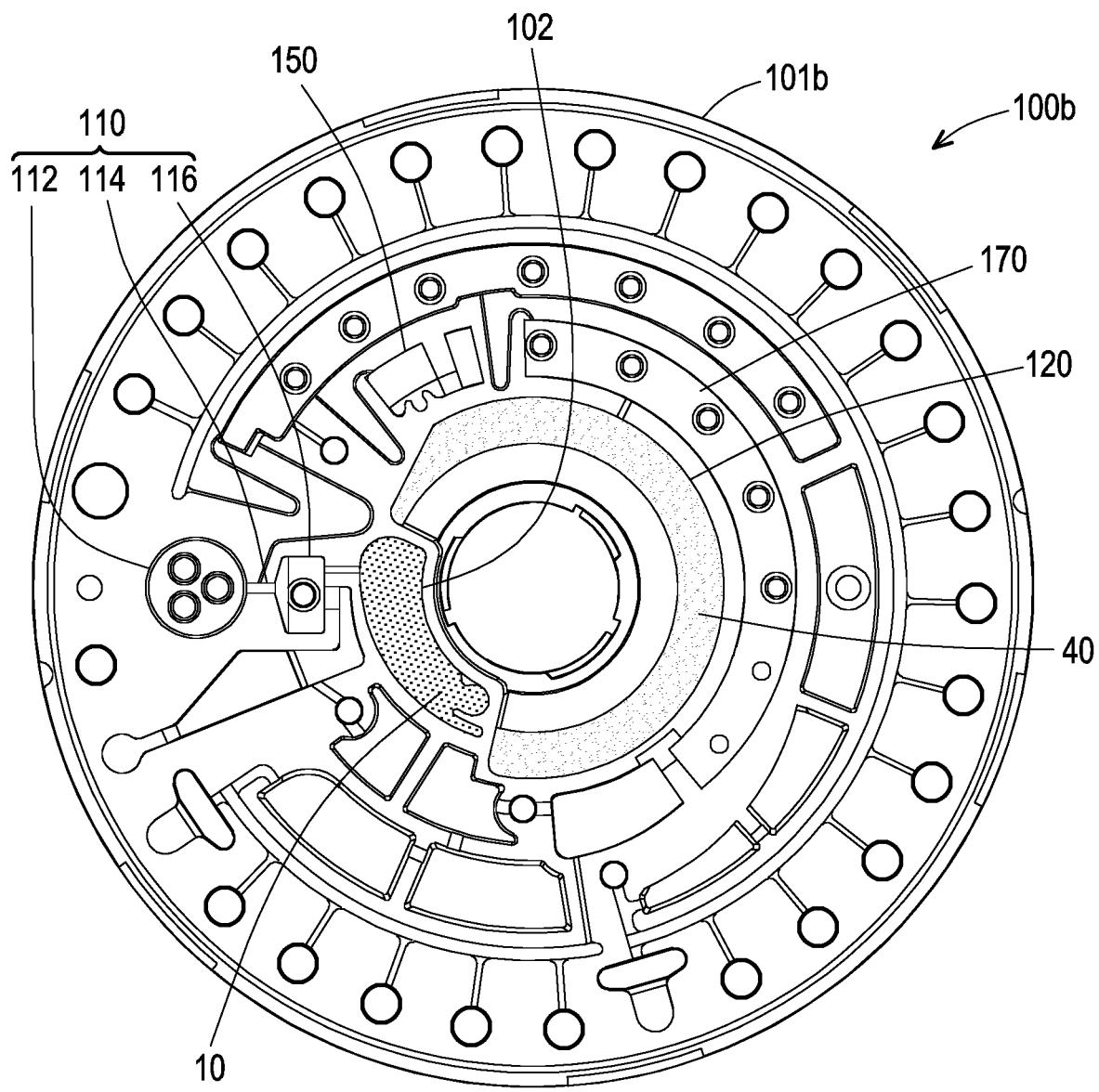
FIG. 23 to FIG. 27 are schematic diagrams of the flow process of the sample in the cartridge of FIG. 22.

The flow process of the sample 10 in the cartridge 100b is described below. FIG. 23 to FIG. 30 are schematic diagrams of the flow process of the sample in the cartridge of FIG. 22. Referring to FIG. 23, the sample 10 is first injected into the first injection chamber 102. The cartridge 100b further includes a fluid chamber 120. At this stage, the fluid 40 is also injected into fluid chamber 120. In this embodiment, the sample 10 is, for example, whole blood, and the fluid 40 is, for example, a diluent, but not limited thereto.

Figure 24:
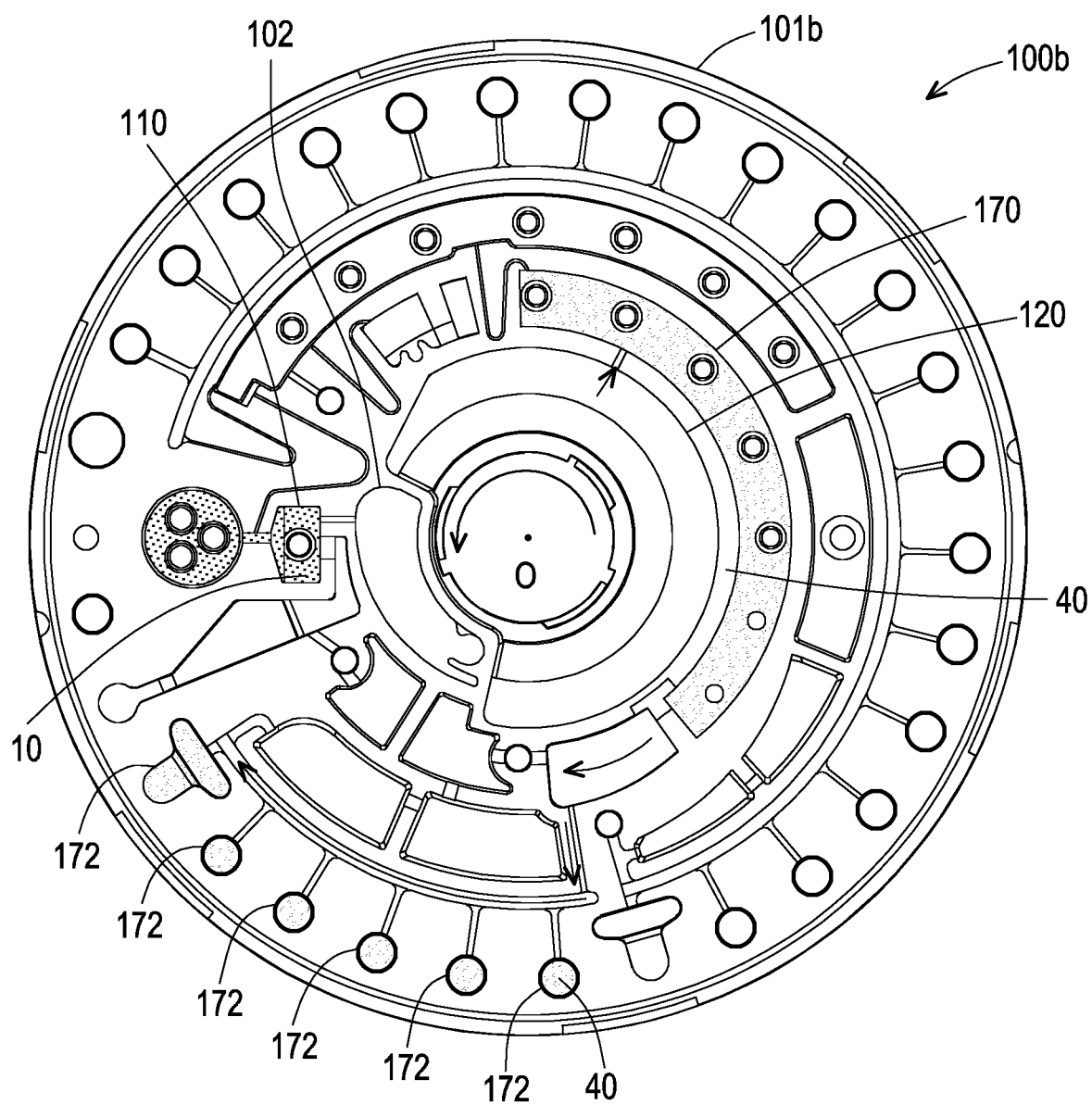

Referring to FIG. 24, the separation chamber 110 is farther from the rotation center O than the first injection chamber 102, and the cartridge 100b rotates at a high speed with the rotation center O as the axis, so that the sample 10 is adapted for being subjected to centrifugal force to flow from the first injection chamber 102 to the separation chamber 110.

In addition, the cartridge 100b further includes a fluid quantitative chamber 170, which is connected to the fluid chamber 120. The fluid quantitative chamber 170 is further away from the rotation center O than the fluid chamber 120, so that the fluid 40 is adapted for being subjected to centrifugal force to flow from the fluid chamber 120 to the fluid quantitative chamber 170.

In this embodiment, the cartridge 100b may optionally include a fluid detection chamber 172, which is connected to the fluid quantitative chamber 170, and the fluid detection chamber 172 is further away from the rotation center O than the fluid quantitative chamber 170. Therefore, at this stage, the excess fluid 40 in the fluid quantitative chamber 170 flows to the fluid detection chamber 172 to be used as a control group for subsequent detection.

Figure 25:
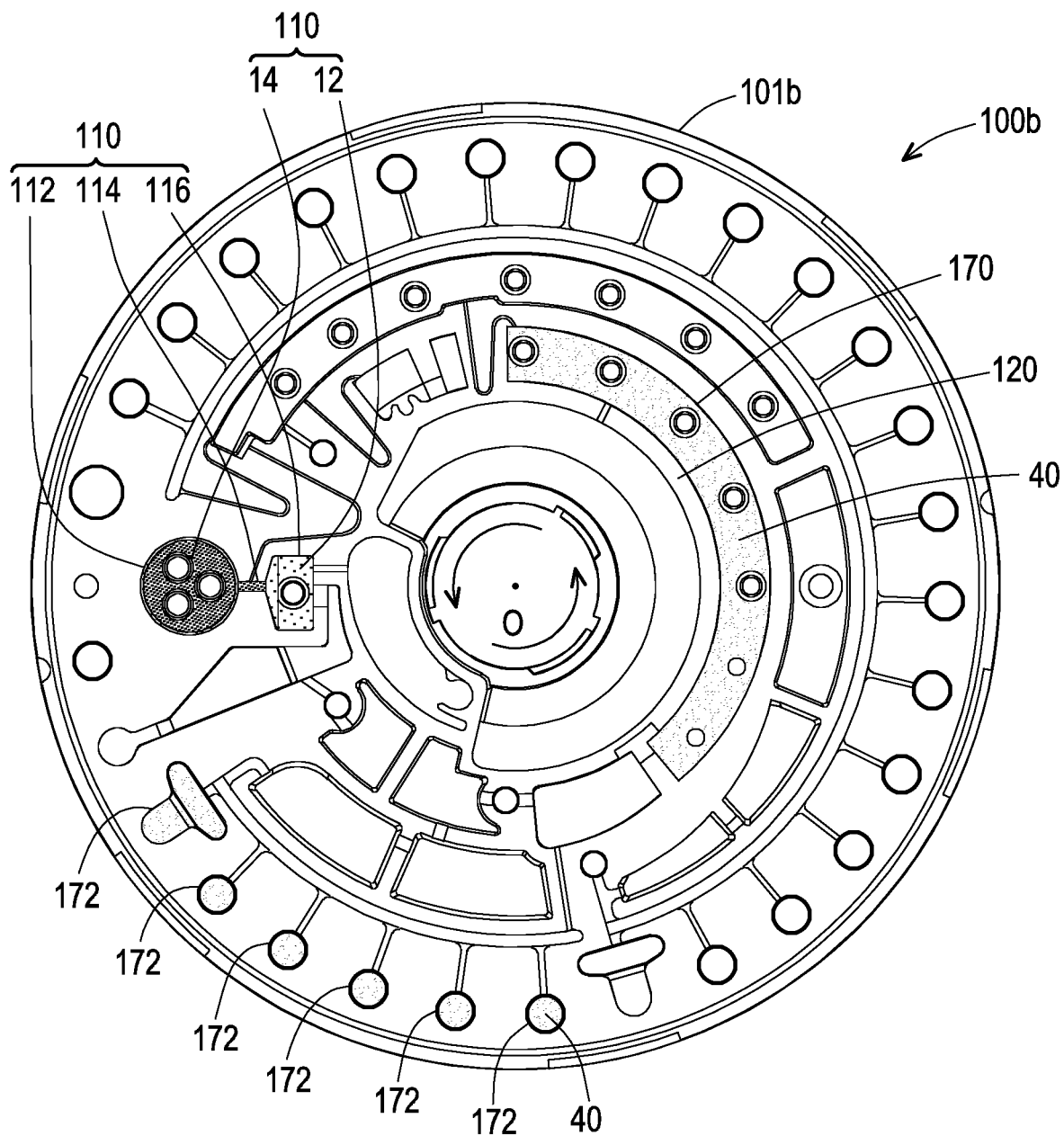

Referring to FIG. 25, the separation chamber 110 includes a lower separation portion 112 and an upper separation portion 116, and there is a connecting portion 114 between the lower separation portion 112 and the upper separation portion 116. The sample 10 includes a first component 12 and a second component 14, and the density of the first component 12 is less than the density of the second component 14. The first component 12 is, for example, blood plasma, and the second component 14 is, for example, blood cells. The cartridge 100b continues to rotate at a high speed with the rotation center O as the axis, so that the first component 12 and the second component 14 may be separated from the sample 10 in the separation chamber 110. The first component 12 separated in the separation chamber 110 is adapted to be located in the upper separation portion 116, and the second component 14 separated in the separation chamber 110 is adapted to be located in the lower separation portion 112.

Figure 26:
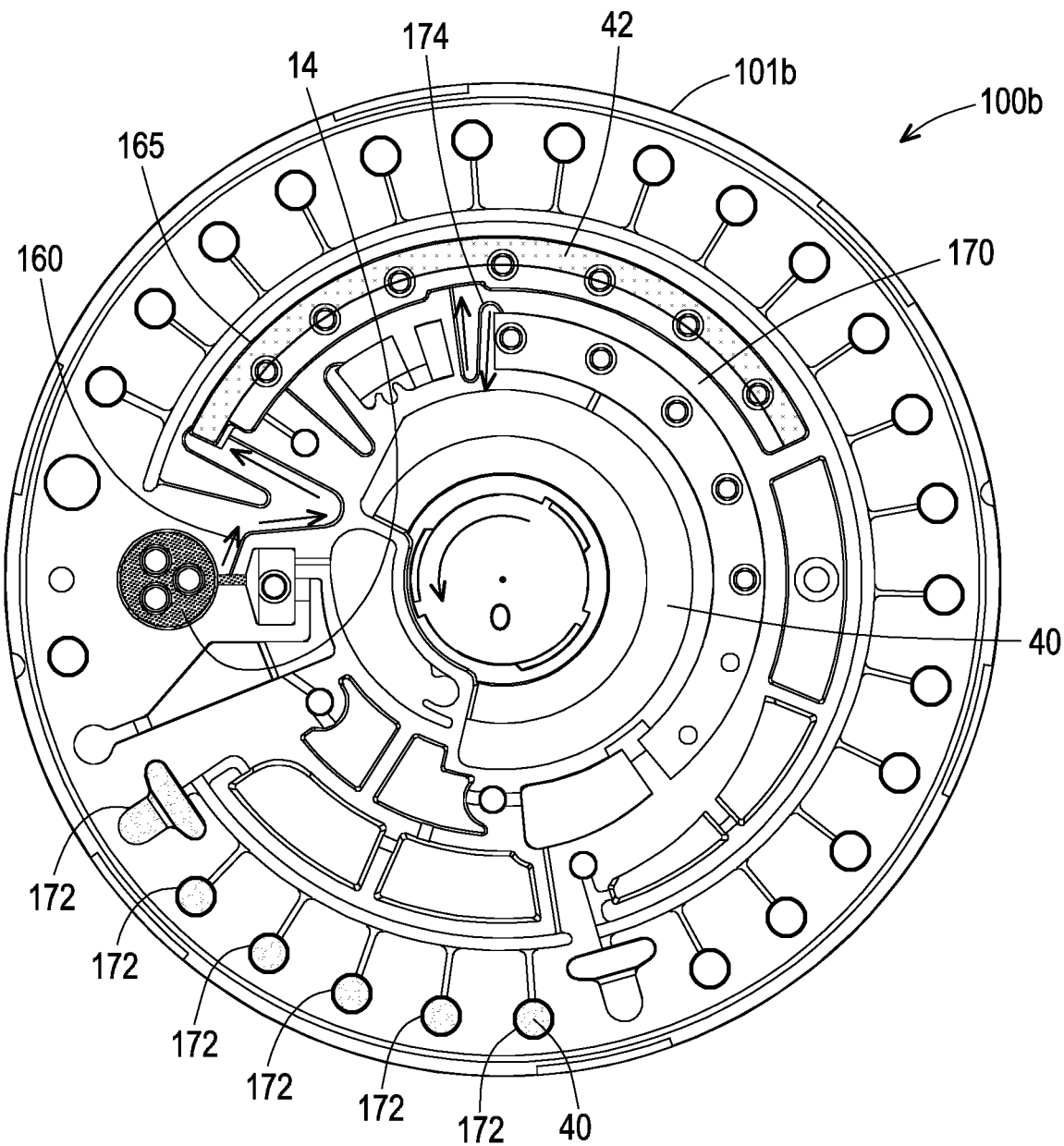

Referring to FIG. 26, the cartridge 100b further includes a first connecting duct 160 and a second connecting duct 174. The first connecting duct 160 is connected between the collection chamber 165 and the upper separation portion 116 of the separation chamber 110 or the connecting portion 114, and the second connecting duct 174 is connected between the fluid quantitative chamber 170 and the collection chamber 165.

At this stage, the cartridge 100b rotates at a low speed with the rotation center O as the axis. At this time, the centrifugal force becomes smaller so the capillary force may function. The first component 12 located in the separation chamber 110 moves to the collection chamber 165 along the first connecting duct 160, and the fluid 40 located in the fluid quantitative chamber 170 moves to the collection chamber 165 along the second connecting duct 174.

Next, after the fluid 40 and the first component 12 move into the collection chamber 165, the cartridge 100b rotates at a high speed with the rotation center O as the axis, so that the fluid 40 and the first component 12 are mixed in the collection chamber 165 to form a mixed liquid 42.

Figure 27:
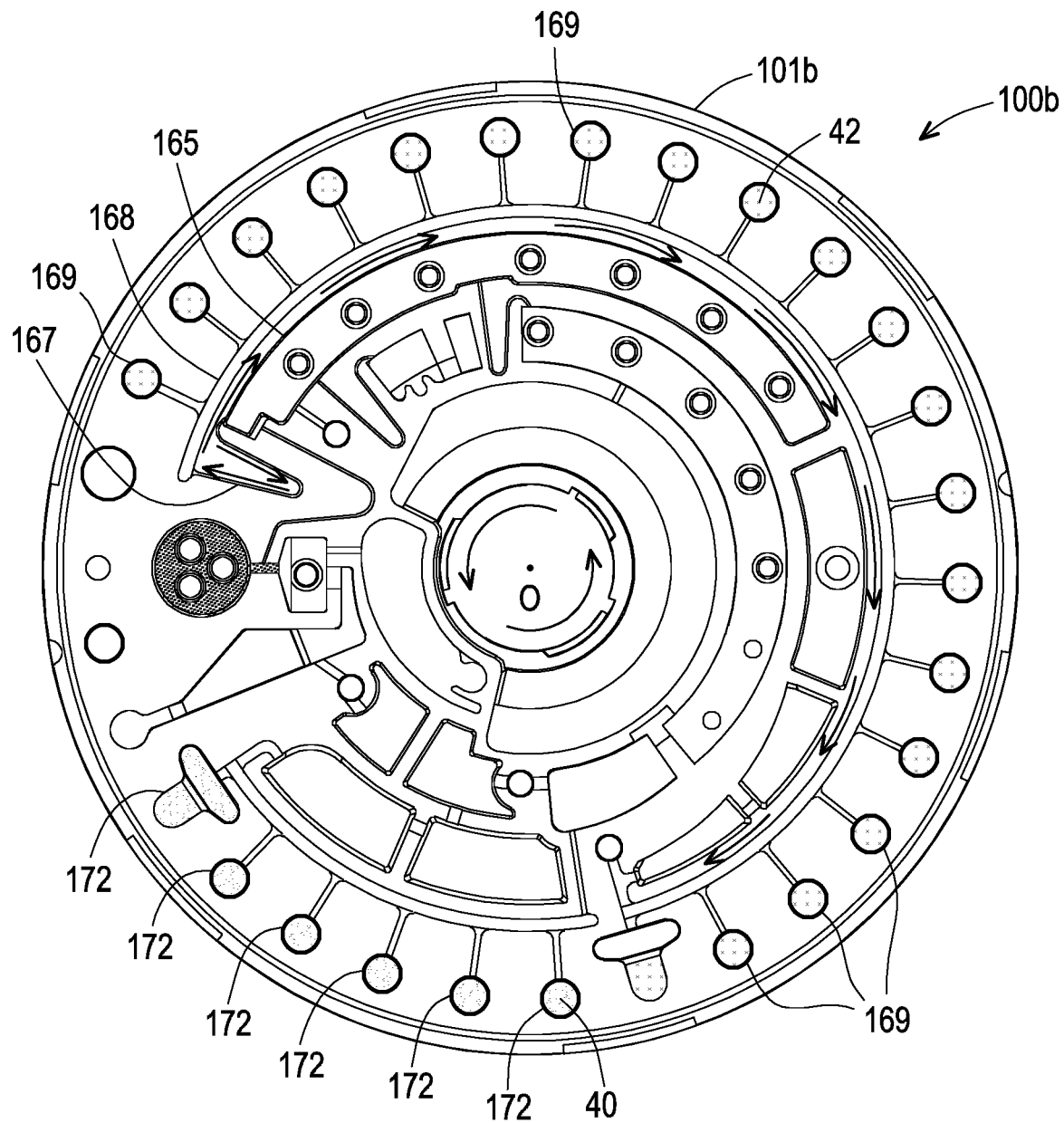

Referring to FIG. 27, the cartridge 100b further includes a distribution chamber 168 and a third connecting duct 167. The first detection chamber 169 is further away from the rotation center O than the distribution chamber 168. The third connecting duct 167 connects the collection chamber 165 and the distribution chamber 168.

At this stage, the cartridge 100b first rotates at a low speed with the rotation center O as the axis. At this time, the centrifugal force becomes smaller so the capillary force may function. The mixed liquid 42 in the collection chamber 165 moves to the distribution chamber 168 along the third connecting duct 167.

Next, the cartridge 100b rotates at a high speed with the rotation center O as the axis, and the mixed liquid 42 in the distribution chamber 168 is subjected to centrifugal force and flows to the first detection chambers 169 disposed along the radial direction, to be detected in the first detection chamber 169.

Figure 28:
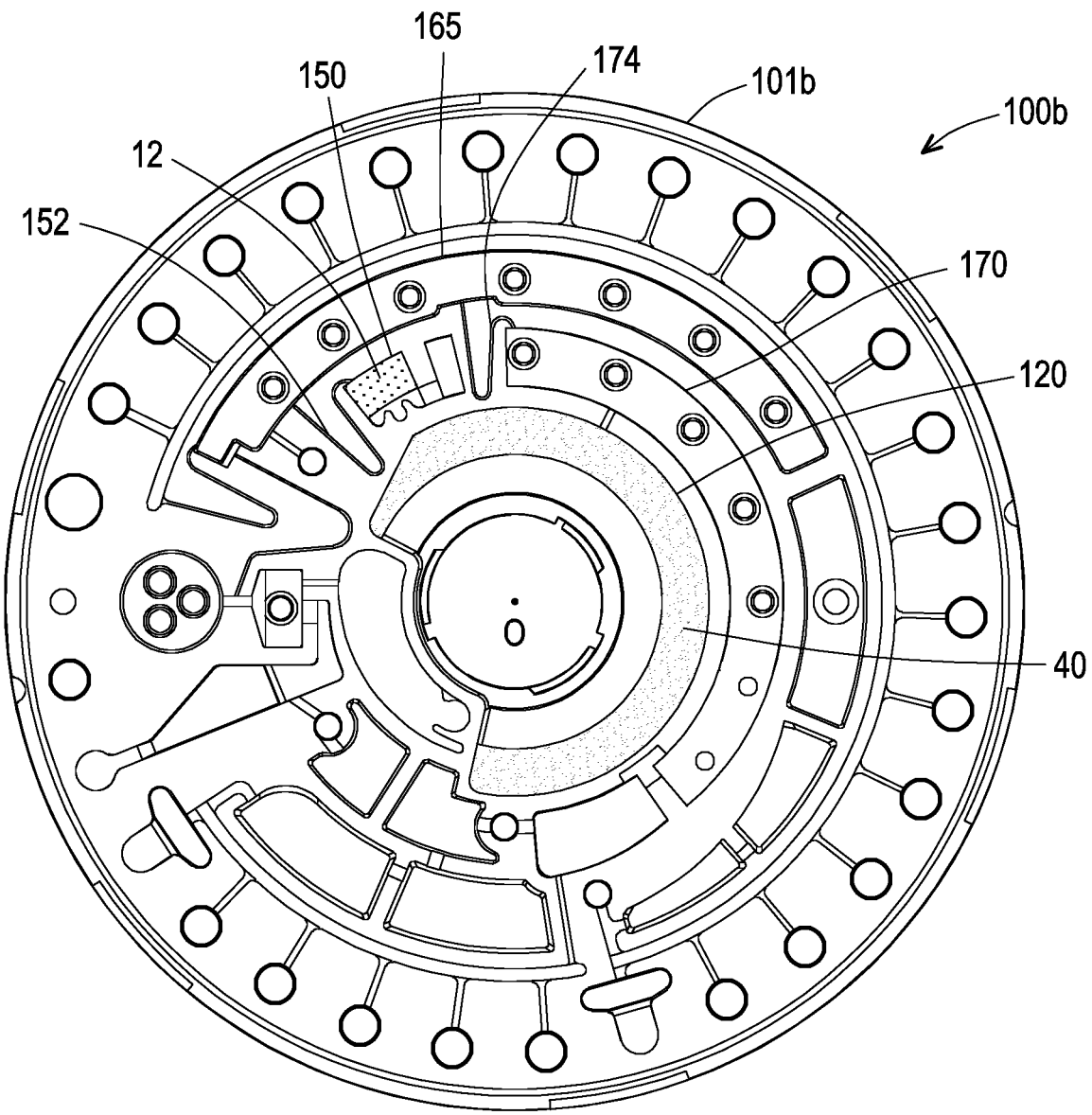
FIG. 28 to FIG. 30 are schematic diagrams of the flow of the first component in the cartridge of FIG. 22 to the collection chamber.
Figure 29:
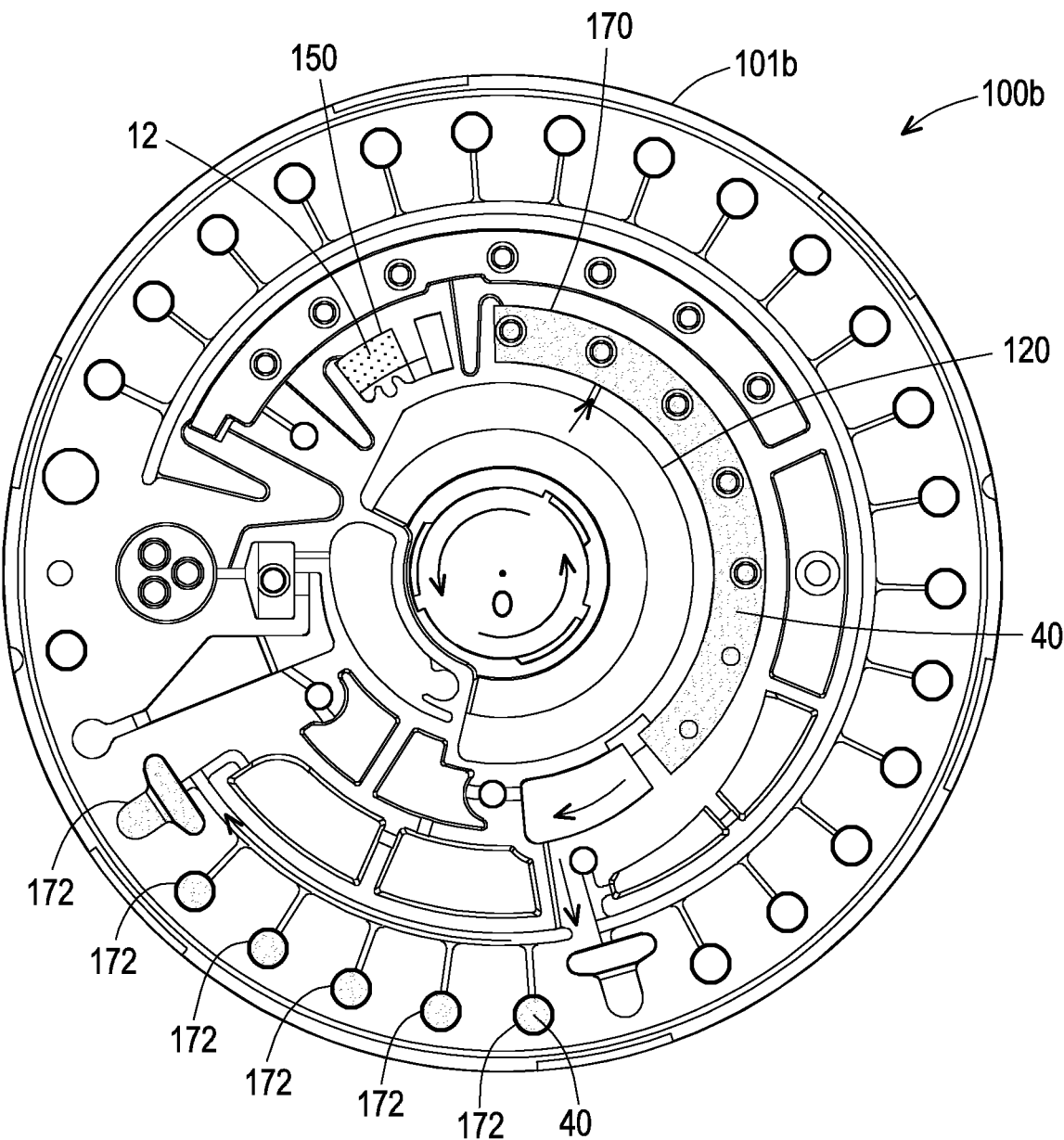
Figure 30:
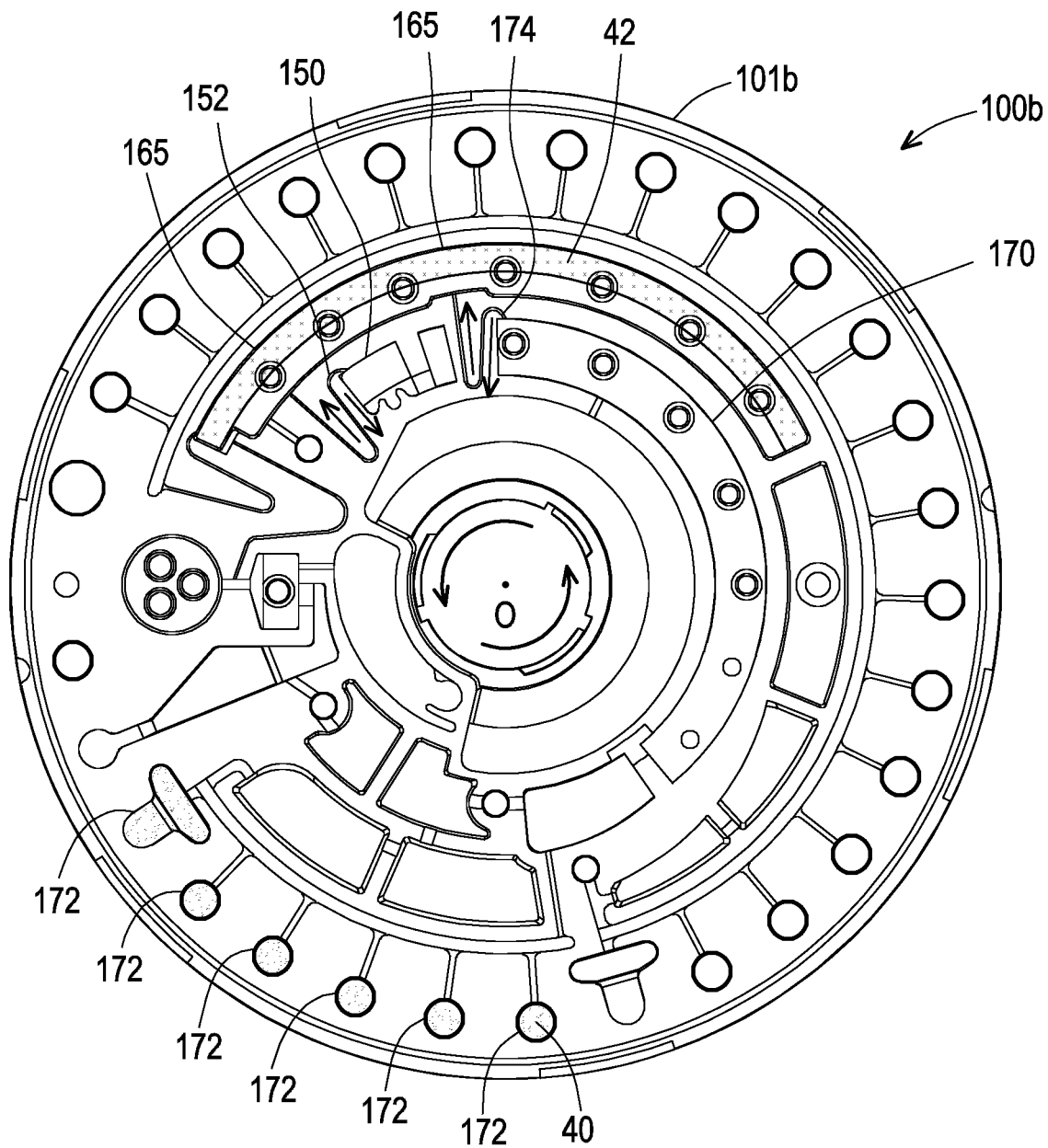

FIG. 28 to FIG. 30 are schematic diagrams of the flow of the first component in the cartridge of FIG. 22 to the collection chamber. Referring to FIG. 28 first, the cartridge 100b further includes a second injection chamber 150 and a fourth connecting duct 152. The second injection chamber 150 is used for injecting the first component 12, and the fourth connecting duct 152 is connected to the second injection chamber 150 and the collection chamber 165. At this stage, the fluid 40 is also injected into fluid chamber 120.

Next, referring to FIG. 29, the cartridge 100b first rotates at a high speed with the rotation center O as the axis, so that the fluid 40 is adapted for being subjected to centrifugal force to flow from the fluid chamber 120 to the fluid quantitative chamber 170. The excess fluid 40 in the fluid quantitative chamber 170 flows to the fluid detection chamber 172 to be used as a control for subsequent detection. On the other hand, in this state, because the centrifugal force is greater than the capillary force, the first component 12 still stays in the second injection chamber 150.

Referring to FIG. 30, the cartridge 100b rotates at a low speed with the rotation center O as the axis. At this time, the centrifugal force becomes smaller and the capillary force may function. The first component 12 in the second injection chamber 150 moves to the collection chamber 165 along the fourth connecting duct 152, and the fluid 40 in the fluid quantitative chamber 170 moves to the collection chamber 165 along the second connecting duct 174.

Next, after the fluid 40 and the first component 12 move into the collection chamber 165, the cartridge 100b rotates at a high speed with the rotation center O as the axis, so that the fluid 40 and the first component 12 are mixed in the collection chamber 165 to form a mixed liquid 42.

Next, as shown in FIG. 27, the cartridge 100b rotates at a low speed with the rotation center O as the axis, and the mixed liquid 42 in the collection chamber 165 moves to the distribution chamber 168 along the third connecting duct 167. Next, the cartridge 100b rotates at a high speed with the rotation center O as the axis, and the mixed liquid 42 in the distribution chamber 168 is subjected to centrifugal force and flows to the first detection chambers 169 disposed along the radial direction, to be detected in the first detection chamber 169.

It is worth mentioning that although the aforementioned examples take two components separated from a blood sample as an example, the disclosure may be widely used in detection samples that may be separated by density difference, such as different aggregates or salts produced from biochemical reactions. The type of sample 10 is not limited thereto.

To sum up, in the biological detection system and the cartridge of the disclosure, the first injection chamber of the cartridge is adapted for injecting the sample, the separation chamber is connected to the first injection chamber, and the sample injected from the first injection chamber is adapted to be separated into the first component and the second component in the separation chamber. Furthermore, the second injection chamber is adapted for injecting the first component. The collection chamber is connected to the separation chamber and the second injection chamber, so that the first component separated by the separation chamber and the first component injected by the second injection chamber are adapted to flow to the same collection chamber. The first detection chamber is connected to the collection chamber. Therefore, the first component in the collection chamber may flow to the first detection chamber for detection. That is to say, the cartridge has a second injection chamber specially used for injecting the first component, and the first component injected from the second injection chamber may flow to the collection chamber without being affected by the chamber capacity or path between the first injection chamber and the separation chamber. Therefore, the injection amount of the first component may be more flexible.

What is claimed is:

1. A cartridge for a detection of a sample or a first component, the sample comprising the first component and a second component, the cartridge comprising:
    a first injection chamber, adapted for injecting the sample;
    a second injection chamber, adapted for injecting the first component;
    a separation chamber, connected to the first injection chamber, wherein the sample injected from the first injection chamber is adapted to be separated into the first component and the second component in the separation chamber;
    a collection chamber, connected to the separation chamber and the second injection chamber;
    a first detection chamber, connected to the collection chamber; and
    a fluid chamber, connected to the collection chamber, wherein the collection chamber is located on a same side of the separation chamber, the fluid chamber, and the second injection chamber.

2. The cartridge according to claim 1, wherein a density of the first component is lower than a density of the second component, the separation chamber comprises a lower separation portion and an upper separation portion, the upper separation portion is connected to the collection chamber, the separated first component is adapted to be located corresponding to the upper separation portion, the separated second component is adapted to be located corresponding to the lower separation portion.

3. The cartridge according to claim 2, wherein the separation chamber further comprises a connecting portion connected between the lower separation portion and the upper separation portion, a chamber body width of the connecting portion in a width direction is relatively smaller than a chamber body width of the upper separation portion or the lower separation portion in the width direction.

4. The cartridge according to claim 1, further comprising:
an accommodating portion, connected to the fluid chamber, wherein the accommodating portion is recessed inward from an outer side of the cartridge; and
a release structure, disposed in the accommodating portion.

5. The cartridge according to claim 1, further comprising:
a first quantitative chamber, connected between the collection chamber and the first detection chamber; and
a second quantitative chamber, connected to the first quantitative chamber, wherein the second quantitative chamber is located on a same side of the first quantitative chamber and the collection chamber.

6. The cartridge according to claim 5, further comprising:
a third quantitative chamber, connected between the first quantitative chamber and the first detection chamber; and
a first connecting duct, connected between the third quantitative chamber and the first detection chamber and comprising a first section and a second section connected in a bending manner, wherein the first section is connected to the third quantitative chamber, the second section is connected to the first detection chamber, the first section and the first quantitative chamber are located on a same side of the third quantitative chamber.

7. The cartridge according to claim 5, further comprising:
a fourth quantitative chamber, connected to the second quantitative chamber;
a second connecting duct, connected to the fourth quantitative chamber and comprising a third section and a fourth section connected in a bending manner, wherein the third section is connected to the fourth quantitative chamber; and
a second detection chamber, connected to the fourth section, wherein the third section and the second quantitative chamber are located on a same side of the fourth quantitative chamber.

8. The cartridge according to claim 1, wherein the cartridge has a rotation center, the separation chamber is further away from the rotation center than the first injection chamber.

9. The cartridge according to claim 8, wherein a density of the first component is lower than a density of the second component, the separation chamber comprising a lower separation portion and an upper separation portion, the separated first component is adapted to be located corresponding to the upper separation portion, the separated second component is adapted to be located corresponding to the lower separation portion, the cartridge further comprising:
a first connecting duct, connected to the collection chamber and the upper separation section of the separation chamber.

10. The cartridge according to claim 8, further comprising:
a fluid chamber, adapted to contain fluid; and
a second connecting duct, connected between the fluid chamber and the collection chamber.

11. The cartridge according to claim 10, further comprising:
a fluid quantitative chamber, connected between the fluid chamber and the second connecting duct, wherein the fluid quantitative chamber is further away from the rotation center than the fluid chamber.

12. The cartridge according to claim 11, further comprising:
a fluid detection chamber, connected to the fluid quantitative chamber, wherein the fluid detection chamber is further away from the rotation center than the fluid quantitative chamber.

13. The cartridge according to claim 8, further comprising:
a distribution chamber, wherein the first detection chamber is further away from the rotation center than the distribution chamber; and
a third connecting duct, connected to the collection chamber and the distribution chamber.

14. The cartridge according to claim 8, further comprising:
a fourth connecting duct, connected to the second injection chamber and the collection chamber.

15. A biological detection system, comprising:
a first turntable, having a first rotary shaft;
a second turntable, having a second rotary shaft, wherein the second turntable disposed on the first turntable is rotatable about the second rotary shaft independent from the first rotary shaft; and
a cartridge, detachably disposed on the second turntable for a detection of a sample or a first component, the sample comprising the first component and a second component, the cartridge comprising:
a first injection chamber;
a second injection chamber, wherein one of the sample and the first component is selectively injected into the first injection chamber or the second injection chamber;
a separation chamber, connected to the first injection chamber, wherein the sample injected from the first injection chamber is adapted to be separated into the first component and the second component in the separation chamber;
a collection chamber, connected to the separation chamber and the second injection chamber, wherein the first component separated by the separation chamber and the first component injected from the second injection chamber are adapted to flow to the collection chamber; and
a first detection chamber, connected to the collection chamber, wherein the first component in the collection chamber is adapted to flow to the first detection chamber for detection;
wherein the first turntable is driven to rotate about the first rotary shaft, and the second turntable is independently driven to rotate the cartridge about the second rotary shaft, wherein the cartridge further comprising:
a fluid chamber, adapted for accommodating fluid and is connected to the collection chamber, wherein the collection chamber is located on a same side of the separation chamber, the fluid chamber, and the second injection chamber, wherein the first component located in the separation chamber or the first component located in the second injection chamber are adapted to be mixed in the collection chamber with the fluid located in the fluid chamber.

16. The biological detection system according to claim 15, wherein a density of the first component is lower than a density of the second component, the separation chamber comprises a lower separation portion and an upper separation portion, the upper separation portion is connected to the collection chamber, the first component separated in the separation chamber is adapted to be located corresponding to the upper separation portion, the second component separated in the separation chamber is adapted to be located corresponding to the lower separation portion.

17. The biological detection system according to claim 15, wherein the cartridge further comprising:
- a first quantitative chamber, connected between the collection chamber and the first detection chamber; and
- a second quantitative chamber, connected to the first quantitative chamber, wherein the second quantitative chamber is located on a same side of the first quantitative chamber and the collection chamber.

18. The biological detection system according to claim 17, wherein the cartridge further comprising:
- a third quantitative chamber, connected between the first quantitative chamber and the first detection chamber; and
- a first connecting duct, connected between the third quantitative chamber and the first detection chamber and comprising a first section and a second section connected in a bending manner, wherein the first section is connected to the third quantitative chamber, the second section is connected to the first detection chamber, the first section and the first quantitative chamber are located on a same side of the third quantitative chamber.

19. The biological detection system according to claim 17, wherein the cartridge further comprising:
- a fourth quantitative chamber, connected to the second quantitative chamber;
- a second connecting duct, connected to the fourth quantitative chamber and comprising a third section and a fourth section connected in a bending manner, wherein the third section is connected to the fourth quantitative chamber; and
- a second detection chamber, connected to the fourth section, wherein the third section and the second quantitative chamber are located on a same side of the fourth quantitative chamber.

20. The biological detection system according to claim 15, wherein the cartridge further comprising:
- a positioning portion, facing the first rotary shaft, the positioning portion comprising a structure extending toward a geometric center of the cartridge or recessing inwards.

* * * * *